US011373394B2

United States Patent
Smith

(10) Patent No.: US 11,373,394 B2
(45) Date of Patent: Jun. 28, 2022

(54) SAMPLING FOR FEATURE DETECTION IN IMAGE ANALYSIS

(71) Applicant: Imagination Technologies Limited, Kings Langley (GB)

(72) Inventor: Timothy Smith, London (GB)

(73) Assignee: Imagination Technologies Limited, Kings Langley (GB)

( * ) Notice: Subject to any disclaimer, the term of this patent is extended or adjusted under 35 U.S.C. 154(b) by 273 days.

(21) Appl. No.: 16/375,943

(22) Filed: Apr. 5, 2019

(65) Prior Publication Data

US 2019/0311218 A1 Oct. 10, 2019

(30) Foreign Application Priority Data

Apr. 5, 2018 (GB) ...................................... 1805695

(51) Int. Cl.
*G06V 10/46* (2022.01)
*G06V 10/52* (2022.01)
(Continued)

(52) U.S. Cl.
CPC ......... *G06V 10/754* (2022.01); *G06K 9/6232* (2013.01); *G06V 10/443* (2022.01); (Continued)

(58) Field of Classification Search
CPC ............... G06K 9/4671; G06K 9/6215; G06K 2009/4666; G06K 9/6253; G06K 9/6211; G06K 9/00; G06K 9/6212; G06K 9/4604; G06K 9/46; G06K 9/0061; G06K 9/4647; G06K 9/4676; G06K 9/00744; G06K 9/4628; G06K 9/527; G06K 9/6201; G06F 16/5838; G06T 7/73; G06T 17/00; G06T 7/246; G06T 2207/20021;
(Continued)

(56) References Cited

U.S. PATENT DOCUMENTS

2010/0177966 A1 7/2010 Ruzon et al.
2011/0255781 A1* 10/2011 Hamsici ............... G06K 9/4671
382/170

(Continued)

OTHER PUBLICATIONS

Krig, Computer Vision Metrics: Survey, Taxonomy, and Analysis, 2014 [retrieved: Oct. 14, 2020], ApressOpen, 498 pages. Retrieved: https://link.springer.com/book/10.1007%2F978-1-4302-5930-5#about (Year: 2014).*

(Continued)

*Primary Examiner* — Matthew C Bella
*Assistant Examiner* — Dennis Rosario
(74) *Attorney, Agent, or Firm* — Potomac Law Group, PLLC; Vincent M DeLuca

(57) ABSTRACT

A computer-implemented method for generating a feature descriptor for a location in an image for use in performing descriptor matching in analysing the image, the method comprising determining a set of samples characterising a location in an image by sampling scale-space data representative of the image, the scale-space data comprising data representative of the image at a plurality of length scales; and generating a feature descriptor in dependence on the determined set of samples.

18 Claims, 11 Drawing Sheets

(51) Int. Cl.
*G06V 30/24* (2022.01)
*G06V 10/75* (2022.01)
*G06K 9/62* (2022.01)
*G06V 10/44* (2022.01)

(52) U.S. Cl.
CPC .......... *G06V 10/462* (2022.01); *G06V 10/52* (2022.01); *G06V 30/2504* (2022.01); *G06T 2207/20016* (2013.01)

(58) Field of Classification Search
CPC ........ G06T 2207/20016; G06V 10/462; G06V 10/40; G06V 10/44; G06V 10/50; G06V 10/52; G06V 30/2504
See application file for complete search history.

(56) References Cited

U.S. PATENT DOCUMENTS

| | | | | |
|---|---|---|---|---|
| 2012/0027290 | A1* | 2/2012 | Baheti | G06V 30/2504 382/154 |
| 2016/0078507 | A1* | 3/2016 | Shivaswamy | G06Q 30/0629 705/26.2 |
| 2019/0043168 | A1* | 2/2019 | Rampal | G06K 9/6212 |

OTHER PUBLICATIONS

Alahi et al., FREAK: Fast Retina Keypoint, Jun. 16-21, 2012 [retrieved May 28, 2021], 2012 IEEE Conference on Computer Vision and Pattern Recognition, pp. 510-517. Retrieved: https://ieeexplore.ieee.org/abstract/document/6247715 (Year: 2012).*

Leutenegger et al., BRISK: Binary Robust invariant scalable keypoints, Nov. 6-13, 2011 [retrieved May 28, 2021], 2011 International Conference on Computer Vision, pp. 2548-2555. Retrieved: https://ieeexplore.ieee.org/abstract/document/6126542 (Year: 2011).*

Lowe, Distinctive Image Features from Scale-Invariant Keypoints, Nov. 2004 [retrieved May 28, 2021], International Journal of Computer Vision, vol. 60, pp. 91-110. Retrieved: https://link.springer.com/article/10.1023/B:VISI.0000029664.99615.94 (Year: 2004).*

Li et al., An Improved SIFT Algorithm Based on Invariant Gradient, Dec. 5, 2015 [retrivd Feb. 6, 2022], Advanced Graphic Communications, Packaging Technology and Materials, Lecture Note Elect Engine, vol. 369, pp. 221-230. Retrivd: https://link.springer.eom/chapter/10.1007/978-981-10-0072-0_29#citeas (Year: 2015).*

Marimon et al.; "DARTs: Efficient scale-space extraction of DAISY keypoints"; 2010 IEEE Computer Society Conference on Computer Vision and Pattern Recognition. IEEE, 2010; pp. 2416-2423.

Lindeberg, "Scale-Space Theory: A Basic Tool for Analyzing Structures at Different Scales," Journal of Applied Statistics, vol. 21, No. 2, pp. 225-270 (1994).

* cited by examiner

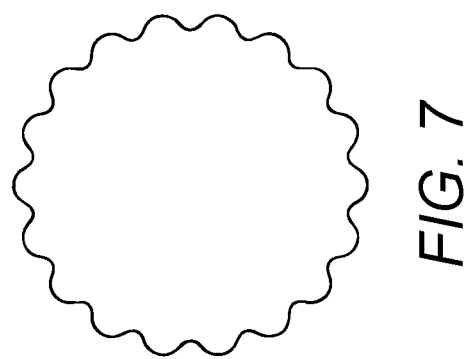
FIG. 7
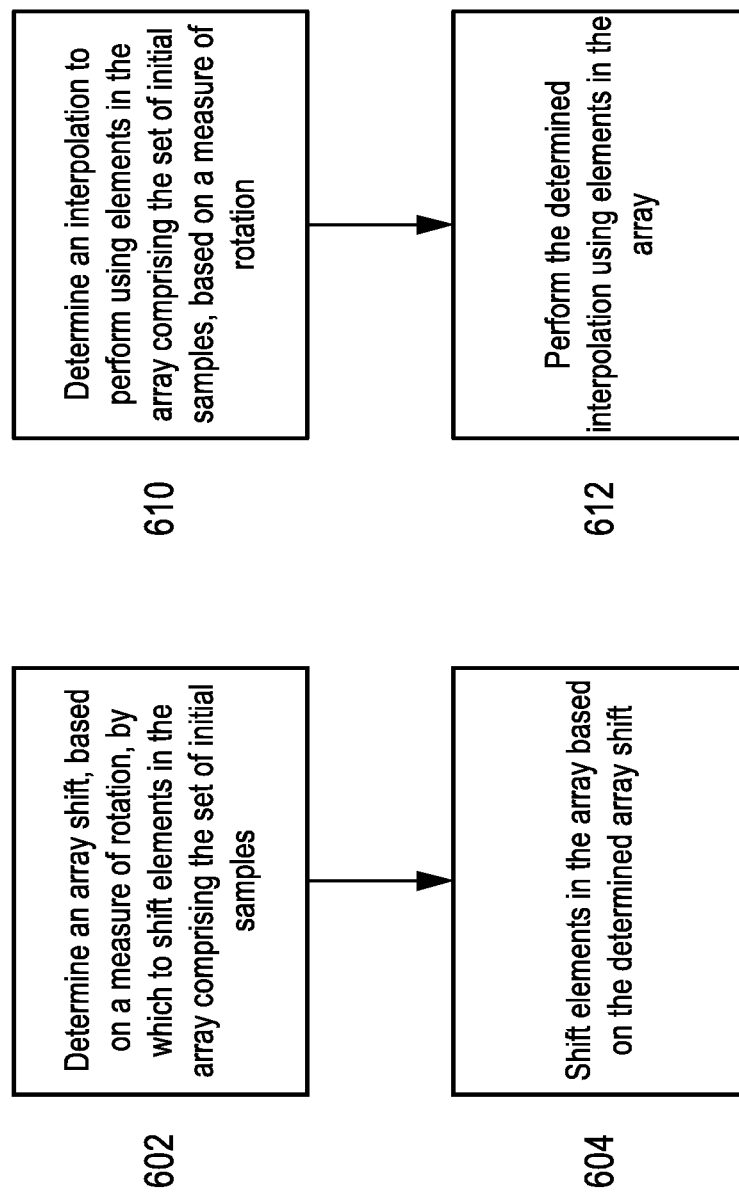
FIG. 6A
FIG. 6B

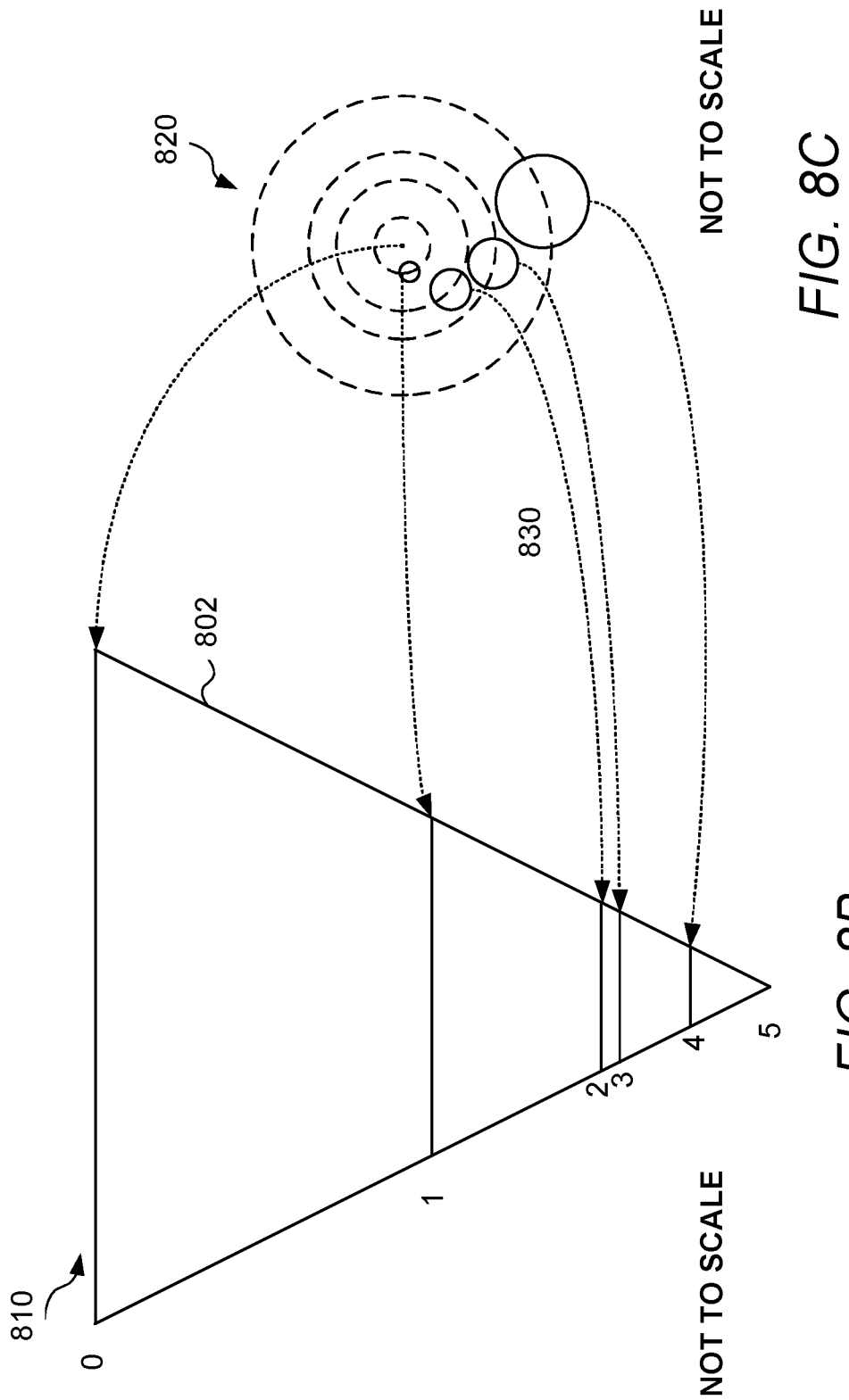

SAMPLING FOR FEATURE DETECTION IN IMAGE ANALYSIS

BACKGROUND

The present disclosure relates to sampling data to generate a feature descriptor for a location in an image for use in performing descriptor matching in analysing the image.

It is useful in computer vision systems and image processing systems to be able to detect and describe features such as local features in images. A "feature" is part of the content of an image which can be used to track the content through multiple images. A feature such as a local feature is characteristic of a region of the image rather than of the image as a whole, i.e. it relates to a part of the image. It is helpful if a feature is distinctive so that features can be matched between images with some degree of confidence. A feature may correspond to an object, or to a part of an object, in an image. Detection of features can be performed using algorithms that are known in computer vision systems. Feature detection algorithms typically compute abstractions of image information for determining whether a feature of a particular type, for example an edge or a corner, is present in the image region under test. Feature detection algorithms can output a location (e.g. pixel coordinates) of parts of the image that represent the feature under test. For example, a corner detection algorithm can output pixel coordinates of regions in the image that represent, or are likely to represent, corners. Feature detection algorithms typically do not provide information about the nature of the features detected. The detection of image features allows a comparison of features between images, which permits knowledge of how objects in a sequence of images might move, and/or of how a camera viewpoint might have changed between images of the sequence.

For instance, a location or point in an image corresponding to a feature and a location or point in another image which may correspond to the same feature can be considered. A small area of the images around each location can be analysed to see whether the locations correspond to the same feature. This can be done by forming a descriptor that is representative of the image location under test, and therefore representative of a feature at that location. The descriptor can be in the form of a descriptor vector, which characterises the particular feature. A descriptor for each location can be formed by extracting and processing samples from the small areas around each location in accordance with a descriptor pattern. The descriptors for the different features in the images can then be compared to assess the likelihood that the locations correspond to the same feature.

Examples of algorithms that determine descriptors are the scale-invariant feature transform (SIFT) algorithm and the speeded up robust features (SURF) algorithm. The oriented FAST [features from accelerated segment test] and rotated BRIEF [binary robust independent elementary features] (ORB) algorithm is an alternative to SIFT. Further algorithms that determine descriptors are the Binary Robust Invariant Scalable Keypoints (BRISK) algorithm and the fast retina keypoint (FREAK) algorithm. These algorithms differ, inter alia, in the descriptor pattern used.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to one aspect, there is provided a computer-implemented method for generating a feature descriptor for a location in an image for use in performing descriptor matching in analysing the image, the method comprising:
  determining a set of samples characterising a location in an image by sampling scale-space data representative of the image, the scale-space data comprising data representative of the image at a plurality of length scales; and
  generating a feature descriptor in dependence on the determined set of samples.

The scale-space data representative of the image may comprise a pre-filtered representation of the image at the plurality of length scales. The pre-filtered representation of the image may have been filtered using a low-pass filter. The pre-filtered representation of the image may have been filtered using one or more of a Gaussian filter and a box filter.

The scale-space data representative of the image may comprise an image pyramid.

The method may comprise sampling the scale-space data representative of the image using a descriptor pattern. The descriptor pattern may be one of a BRISK, ORB or FREAK descriptor pattern, or be based on one of a BRISK, ORB or FREAK descriptor pattern.

The location in the image may be a point in the image. The location in the image may be a pixel location in the image. The location in the image may be a keypoint in the image.

Sampling the scale-space data may comprise:
  analysing portions of the scale-space data representing the location at different length scales to determine a measure of likelihood for each analysed portion, the measure of likelihood representing the likelihood of a feature being at the respective length scale;
  determining the portion of the scale-space data resulting in a turning point in the measure of likelihood;
  determining a length scale at which to sample the scale-space data to determine the set of samples in dependence on the determined portion.

A relatively smaller scale-space representation may be placed within a relatively larger scale-space representation in dependence on an identified length scale. The relatively smaller scale-space representation may comprise a descriptor pyramid and the relatively larger scale-space representation may comprise an image pyramid. The method may comprise sampling the scale-space data using the relatively smaller scale-space representation at the identified length scale.

The method may comprise identifying the location in the image in accordance with one or more location identification or detection algorithms. The method may comprise identifying at least one of a location and a length scale in the scale-space data associated with the identified location in the image. Sampling the scale-space data may comprise sampling the scale-space data in dependence on the identified length scale. Sampling the scale-space data may comprise sampling data at a level in the scale-space data associated with the identified length scale. Sampling the scale-space data may comprise interpolating between data at levels in the scale-space data associated with length scales above and below the identified length scale.

The scale-space data may comprise data having been filtered at different length scales.

The data in the scale-space data having been filtered at different length scales may correspond to filtered samples to be extracted in respect of different radial distances in the descriptor pattern from the centre of the descriptor pattern.

The descriptor pattern may comprise at least one ring surrounding the location in the image. The at least one ring may be one of a circle, a wavy circle and a polygon. The descriptor pattern may comprise a plurality of rings. The rings of the plurality of rings may be concentric.

The determined set of samples may be stored in an array, and generating the feature descriptor in dependence on the determined set of samples may comprise forming a modified array.

The method may comprise determining a measure of rotation for the location in the image, the measure of rotation describing an angle between an orientation of the image and a characteristic direction of the image at the location, and generating the feature descriptor in dependence on the determined measure of rotation. Forming the modified array may comprise shifting elements of at least one portion of the array along a number of positions in the respective portion of the array, the number of positions being determined in dependence on the determined measure of rotation. Forming the modified array may comprise interpolating between two or more samples of the determined set of samples. The two or more samples of the determined set of samples may have been obtained from a single ring of the descriptor pattern. Forming the modified array may comprise interpolating between the two or more samples of the determined set of samples along a portion of the shape of the ring to which the two or more samples correspond.

The two or more samples of the determined set of samples may have been obtained from a plurality of rings of the descriptor pattern. Two rings of the plurality of rings may be adjacent in the descriptor pattern. The two or more samples of the determined set of samples may comprise $N_1$ samples from a first ring and $N_2$ samples from a second ring, where $N_1 \leq N_2$. The first ring may be radially inside the second ring.

The method may comprise discarding the modified array once the feature descriptor has been generated.

According to another aspect, there is provided, a descriptor generation system for generating a feature descriptor for a location in an image for use in performing descriptor matching in analysing the image, the descriptor generation system comprising:
a feature descriptor generator configured to:
determine a set of samples characterising a location in an image by sampling, using a sampling unit, scale-space data representative of the image, the scale-space data comprising data representative of the image at a plurality of length scales; and
generate a feature descriptor in dependence on the determined set of samples.

The scale-space data representative of the image may comprise a pre-filtered representation of the image at the plurality of length scales. The pre-filtered representation of the image may have been filtered using a low-pass filter. The pre-filtered representation of the image may have been filtered using one or more of a Gaussian filter and a box filter.

The scale-space data representative of the image may comprise an image pyramid.

The feature descriptor generator may be configured to sample the scale-space data representative of the image using a descriptor pattern. The descriptor pattern may be one of a BRISK, ORB or FREAK descriptor pattern, or be based on one of a BRISK, ORB or FREAK descriptor pattern.

The location in the image may be a point in the image. The location in the image may be a pixel location in the image. The location in the image may be a keypoint in the image.

The feature descriptor generator may be configured to sample the scale-space data by:
analysing portions of the scale-space data representing the location at different length scales to determine a measure of likelihood for each analysed portion, the measure of likelihood representing the likelihood of a feature being at the respective length scale;
determining the portion of the scale-space data resulting in a turning point in the measure of likelihood;
determining a length scale at which to sample the scale-space data to determine the set of samples in dependence on the determined portion.

The descriptor generation system may be configured to place a relatively smaller scale-space representation within a relatively larger scale-space representation in dependence on an identified length scale. The relatively smaller scale-space representation may comprise a descriptor pyramid and the relatively larger scale-space representation may comprise an image pyramid. The feature descriptor generator may be configured to sample the scale-space data using the relatively smaller scale-space representation at the identified length scale.

The descriptor generation system may be configured to identify the location in the image in accordance with one or more location identification or detection algorithms. The descriptor generation system may be configured to identify at least one of a location and a length scale in the scale-space data associated with the identified location in the image. The feature descriptor generator may be configured to sample the scale-space data in dependence on the identified length scale. The feature descriptor generator may be configured to sample the scale-space data at a level in the scale-space data associated with the identified length scale. The feature descriptor generator may be configured to sample the scale-space data by interpolating between data at levels in the scale-space data associated with length scales above and below the identified length scale.

The scale-space data may comprise data having been filtered at different length scales. The data in the scale-space data having been filtered at different length scales may correspond to filtered samples to be extracted in respect of different radial distances in the descriptor pattern from the centre of the descriptor pattern.

The descriptor pattern may comprise at least one ring surrounding the location in the image. The at least one ring may be one of a circle, a wavy circle and a polygon. The descriptor pattern may comprise a plurality of rings. The rings of the plurality of rings may be concentric.

The descriptor generation system may be configured to store the determined set of samples in an array, and the feature descriptor generator may be configured to generate the feature descriptor in dependence on the determined set of samples by forming a modified array.

The descriptor generation system may be configured to determine a measure of rotation for the location in the image, the measure of rotation describing an angle between an orientation of the image and a characteristic direction of the image at the location, and generate the feature descriptor in dependence on the determined measure of rotation. The descriptor generation system may be configured to form the modified array by shifting elements of at least one portion of the array along a number of positions in the respective portion of the array, the number of positions being determined in dependence on the determined measure of rotation. The descriptor generation system may be configured to form the modified array by interpolating between two or more samples of the determined set of samples. The two or more samples of the determined set of samples may have been obtained from a single ring of the descriptor pattern.

The descriptor generation system may be configured to form the modified array by interpolating between the two or more samples of the determined set of samples along a portion of the shape of the ring to which the two or more samples correspond.

The two or more samples of the determined set of samples may have been obtained from a plurality of rings of the descriptor pattern. Two rings of the plurality of rings may be adjacent in the descriptor pattern. The two or more samples of the determined set of samples may comprise $N_1$ samples from a first ring and $N_2$ samples from a second ring, where $N_1 \leq N_2$. The first ring may be radially inside the second ring.

The descriptor generation system may be configured to discard the modified array once the feature descriptor has been generated.

According to another aspect, there is provided a descriptor generation system configured to perform the method as described herein.

According to another aspect, there is provided a descriptor generation system as described herein, wherein the descriptor generation system is embodied in hardware on an integrated circuit.

According to another aspect, there is provided a method of manufacturing, using an integrated circuit manufacturing system, a descriptor generation system as described herein.

According to another aspect, there is provided a method of manufacturing, using an integrated circuit manufacturing system, a descriptor generation system as described herein, the method comprising:
  processing, using a layout processing system, a computer readable description of the graphics processing system so as to generate a circuit layout description of an integrated circuit embodying the descriptor generation system; and
  manufacturing, using an integrated circuit generation system, the descriptor generation system according to the circuit layout description.

According to another aspect, there is provided computer program code for performing a method as described herein.

According to another aspect, there is provided a non-transitory computer readable storage medium having stored thereon computer readable instructions that, when executed at a computer system, cause the computer system to perform the method as described herein.

According to another aspect, there is provided an integrated circuit definition dataset that, when processed in an integrated circuit manufacturing system, configures the integrated circuit manufacturing system to manufacture a descriptor generation system as described herein.

According to another aspect, there is provided a non-transitory computer readable storage medium having stored thereon a computer readable description of a descriptor generation system as described herein that, when processed in an integrated circuit manufacturing system, causes the integrated circuit manufacturing system to manufacture an integrated circuit embodying the descriptor generation system.

According to another aspect, there is provided a computer readable storage medium having stored thereon a computer readable description of a descriptor generation system as described herein which, when processed in an integrated circuit manufacturing system, causes the integrated circuit manufacturing system to:
  process, using a layout processing system, the computer readable description of the descriptor generation system so as to generate a circuit layout description of an integrated circuit embodying the descriptor generation system; and
  manufacture, using an integrated circuit generation system, the descriptor generation system according to the circuit layout description.

According to another aspect, there is provided an integrated circuit manufacturing system configured to manufacture a descriptor generation system as described herein.

According to another aspect, there is provided an integrated circuit manufacturing system comprising:
  a non-transitory computer readable storage medium having stored thereon a computer readable description of a descriptor generation system as described herein;
  a layout processing system configured to process the computer readable description so as to generate a circuit layout description of an integrated circuit embodying the descriptor generation system; and
  an integrated circuit generation system configured to manufacture the descriptor generation system according to the circuit layout description.

BRIEF DESCRIPTION OF THE DRAWINGS

The present invention is described by way of example with reference to the accompanying drawings. In the drawings:

FIG. 6A shows a flow chart of an example process for generating a feature descriptor, based on shifting elements in an array;

FIG. 6B shows a flow chart of an example process for generating a feature descriptor, based on interpolating between values of elements in an array;

FIG. 7 shows an example of a ring shape;

FIG. 8B schematically shows an example of a descriptor pyramid;

FIG. 8C schematically shows a representation of a descriptor pattern;

DETAILED DESCRIPTION

Figure 1B:
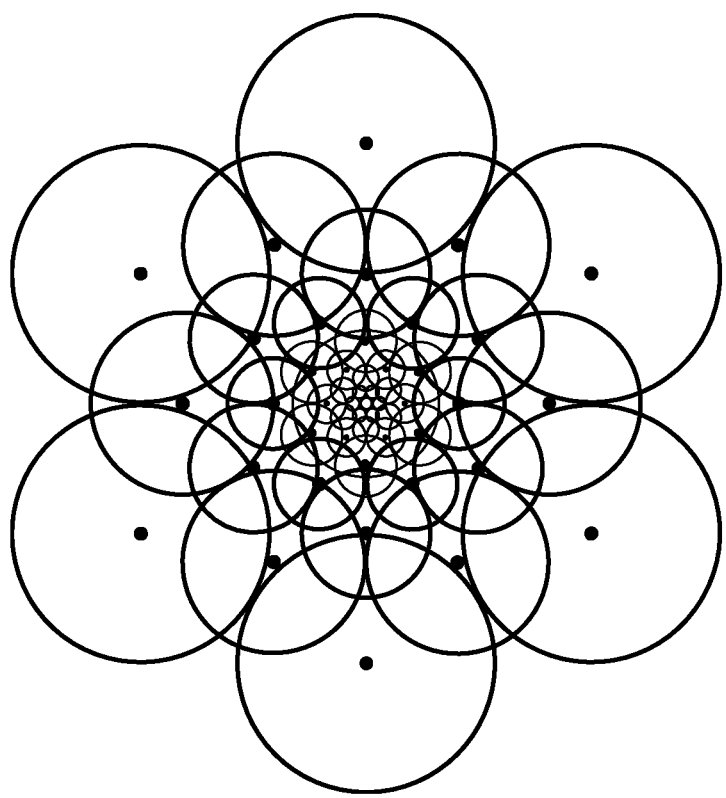
FIG. 1B shows an example of a feature descriptor pattern in accordance with FREAK.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

In computer vision and image processing techniques, images or features of images can be compared with other images or features of other images to attempt to identify matches between those images or features. This is useful in many applications, including but not limited to camera calibration, 3D reconstruction, visual SLAM (Simultaneous Localisation And Mapping), image registration and/or image stitching, video stabilisation and object detection/recognition and/or tracking. In object tracking, it is desirable to know the positions in different images of the same object. For example, an object at position (x, y) in one image may have moved to a position (x', y') in another image. This movement of the object in the frame of reference of the images may be due to movement of the object itself, movement of the effective camera position and/or orientation when taking or generating the image, or both. The images may include images of real scenes, computer-generated scenes, or a combination of real and computer-generated scenes. The images might form a sequence of images, such as a video sequence.

In image reconstruction or stitching, it is desirable to know how two or more images relate to one another. For example, if a camera viewpoint has moved from one image to the next, or if there are two cameras imaging the same scene which are spaced apart from one another, then there is likely to be an area of overlap between two images. Comparing features in this area of overlap enables the position and orientation of the two images relative to one another to be determined. A mapping operation from one image to the other image can be defined. One image can be aligned with another. Hence it is useful to know how a camera position, or the effective camera position, changes between scenes or images. Changes in the effective camera position can include lateral translations of the camera, rotations of the camera, changes in the zoom of the camera, perspective changes and so on.

In an initial stage of image processing, it is useful to determine a feature, or more usually, a plurality of features, in an image. As an example, there may be tens or hundreds of features identified in an image.

A feature may be a structural feature in the content of an image, such as a point, an edge, a corner, a ridge, a blob, and so on. A feature may be detected by performing processing on an area of an image. The area may be defined around a location of interest in the image, such as a location at which a feature might be present. The processing to detect the feature may compute an abstraction of image information, as will be explained below.

When detecting features, locations such as pixels that have been identified as being of interest can be investigated. In some examples a subset of the pixels of the whole image can be investigated. In other examples all of the pixels in the image can be investigated.

Feature Descriptor

The features of interest, which might in some examples include all pixels in an image, as noted above, may be analysed to determine an abstracted representation or characterisation of the feature, or of the area around the feature. This representation of a feature can be called a feature descriptor. The feature descriptor comprises information relating to the location/feature which was analysed when generating the feature descriptor. This information can be arranged as a feature vector. That is to say, the feature descriptor can comprise a feature vector. The arrangement of the information in the form of the feature vector can facilitate a simple comparison between feature descriptors of different features, e.g. for use in feature matching.

A feature descriptor can be formed in one of several ways and some examples are provided below.

A location of interest is identified. This location can be a point in the image, such as a pixel location in the image. The location of interest can be a keypoint in the image, i.e. an interest point in the image. A keypoint or location of interest is a point or region in the image that has a particular characteristic or stands out in the image. A keypoint may be identified in accordance with one or more keypoint identification or detection algorithms. For example, keypoints or locations of interest can be defined as corners and/or edges in an image. A corner and edge search can be performed to identify the locations of interest in that image. Locations of interest can be defined in any suitable way, and searched for accordingly.

A feature descriptor is typically formed by extracting and processing samples from an image based on a descriptor pattern. The descriptor pattern, or sampling pattern, is a pattern of sampling points around the location of interest. The descriptor pattern extends across an area. The area usually includes the location of interest, and is usually centred on the location of interest. An example of a feature descriptor pattern used in accordance with the BRISK (Binary Robust Invariant Scalable Keypoints) algorithm is given in FIG. 1A. The points represent sampling points. The circles represent areas surrounding each sampling point that contribute to the sampled value at each respective sampling point. The area surrounding each sampling point can be processed by applying a filter, such as a Gaussian or box filter, to the values of pixels within that area in order to determine the sampled value for the sampling point. Thus the values of each pixel in the area can contribute to the sampled value at the point on which that area is centred. This can, for example, smooth out noise in the pixel value at which the sampling point is located. For instance, the size of the circle is dependent on the standard deviation of the filter applied at the respective sampling point.

Figure 1A:
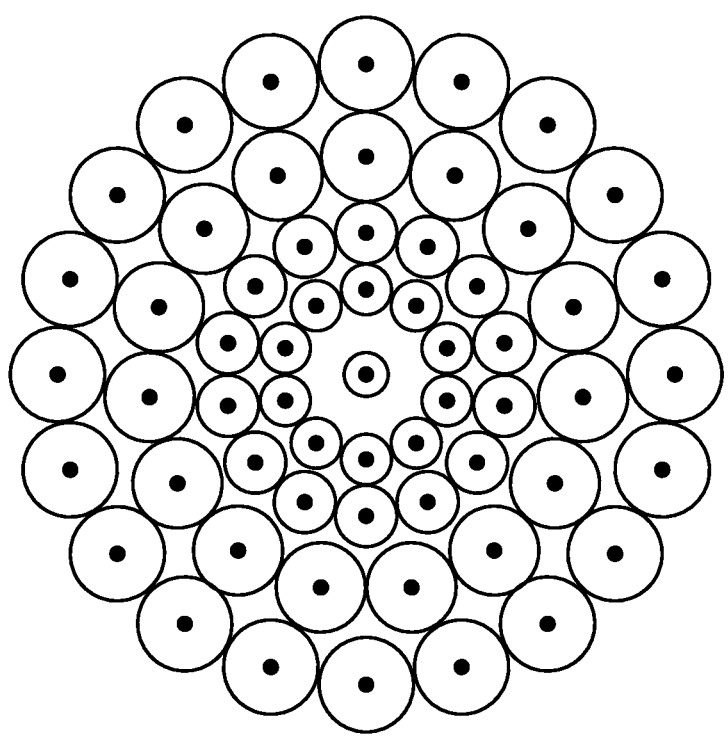
FIG. 1A shows an example of a feature descriptor pattern in accordance with BRISK.

As can be seen with reference to FIG. 1A, a central sampling point is surrounded by further sampling points arranged on a series of concentric circular rings. In FIG. 1A, four sampling rings are shown surrounding the central sampling point.

FIG. 1B illustrates another example sampling pattern. In FIG. 1B the pattern used in the FREAK (fast retina keypoint) algorithm is shown. In FIG. 1B, the points represent the sampling points, and the circles represent respective areas around those points which contribute to the sampled value at each sampling point. Again, the areas can be processed by applying a filter, such as a Gaussian or box filter, to the values of pixels within each area in order to determine the sampled value for the sampling point. With reference to FIG. 1B, a central sampling point is again surrounded by further sampling points arranged on a series of concentric circular rings.

Once values have been obtained (i.e. sampled) in respect of a sampling point according to a sampling pattern, comparisons can be made between these values in order to determine a feature descriptor for the sampling point. These comparisons are made in accordance with a known comparison scheme. This is to ensure repeatability and consistency of the comparisons made between the values for each sampling point. In some examples, pair-wise comparisons can be made. For example, the value for a point x in a list or array of sampled values for the sampling points can be compared with the value for a point y in the list or array. Comparisons between two, or more than two, sample values may be performed. Linear combinations of sample values may be performed. More complex operations may be performed. The number of comparisons made can be greater than (or less than or equal to) the number of sampling points. For example, a sampling point can be compared to more than one other sampling point. The output values may be stored in an array, such as a linear array. The array will have the same number of elements as the number of comparisons that have been made. For example, there may be 512 comparisons, leading to the generation of a linear array of 512 elements. The values in the array represent a feature descriptor in the form of a feature vector.

In some examples, the comparisons can be threshold comparisons. For example, a determination can be made as to whether the value for point x is greater than or equal to the value for point y. If this is true, an output value of '1' can be generated, otherwise an output value of '0' can be generated. Where the comparisons are threshold comparisons, as in the example above, a binary string may be output. For example, if 512 pairs of sampling points are chosen, then the result of the pair-wise comparison will be a binary string which is 512 bits long. Other numbers of pairs of sampling points can be selected as desired for the pair-wise comparison.

The feature descriptor need not be binary. It may, for example, be a floating-point vector.

As will be appreciated, the configuration of sampling points differs between the descriptor patterns shown in FIGS. 1A and 1B. The comparisons between extracted sample values may also differ. This will give different feature descriptors when the different patterns are applied to the same location in an image. Hence, when comparing feature descriptors of different locations to determine a match in those locations, the same descriptor pattern should be used to generate those feature descriptors.

The set of samples extracted from the image may comprise a number of samples corresponding to the number of sampling points in the feature descriptor pattern. Hence, a set of samples comprises samples that correspond to values extracted in accordance with a descriptor pattern. The samples may correspond to intensity values. Other pixel attribute values can be used.

The process of extracting samples from the image, for example to form the set of samples from which the feature descriptor can be generated, may involve a relatively large amount of processing (i.e. be carried out at a relatively large processing cost) and may involve reading image data out of a memory where the image values are stored, which may introduce significant latency.

The feature descriptors, for example binary strings, can be compared at a low, or relatively low (for example as compared to the sample extraction process), processing cost. Comparisons between feature descriptors can be performed by computing an exclusive OR (XOR) between the feature descriptors, by computing the Euclidean distance between the feature descriptors (where the feature descriptor vectors comprise floating-point values), or computing the Hamming distance between the feature descriptors. This comparison will give an indication of the similarity of the feature descriptors, and hence of the similarity of the corresponding features.

A determination of whether the locations under test correspond to one another can be made in dependence on the similarity of the feature descriptors.

In the case of a lateral translation of an object between two images (due to either or both of a change in an object position in a scene and a change in a camera position), i.e. where there is no rotation or perspective change between the images, it will be sufficient to generate feature descriptors for each image at the same orientation and length scale.

However, where a rotation may be present between the images, for example because the camera viewpoint is rotated between the two images, which may be due to a misalignment between two cameras used to image a scene, simply using the descriptor pattern as above may not result in the determination of a match, even where the locations in the images do, in fact, correspond to the same object or feature. In general, it is desirable to account for possible rotation, since the transformation between the images will generally not be known in advance. The generation of the feature descriptors should therefore be rotation-invariant. In other words, the generation of the feature descriptors should be such as to permit a match to be determined between identical (or sufficiently similar) image portions even where those image portions are at some arbitrary angle to one another.

It is possible to do this by rotating the descriptor pattern and image relative to one another. Feature descriptors can be generated at a number of such relative rotations, which can be dependent on the implementation. For example the descriptor pattern can be rotated and used on the image at that rotation. Different rotations of the descriptor pattern can be used on the image. A series of rotations up to a full 360-degree relative rotation of the pattern and the image may be carried out. This can help ensure the best matching result. The accuracy with which the features can be matched will in general depend on the number of individual feature descriptors generated for each location in the image, with a greater accuracy being obtained where a greater number of rotational divisions are used to obtain the feature descriptors. For example, where a descriptor pattern is rotated in 10-degree increments, and a feature descriptor generated for each rotation, a total of 36 feature descriptors will be generated. Where a descriptor pattern is rotated in 5-degree increments, and a feature descriptor generated for each rotation, a total of 72 feature descriptors will be generated. This is computationally expensive, since it involves determining many different feature descriptors, and it might not reliably find the best matching rotation because the true rotation might not be the same as any of the individual rotations for which feature descriptors are generated. As such, this approach is not usually used in practice.

An alternative, and the approach that is typically followed, is to initially sample a location of an image to determine some measure of rotation of that location of the image. For example, the measure of rotation may be an angle between the orientation of the image and a characteristic direction of the location of the image. For example, the characteristic direction may be an image gradient. The image gradient may be a directional change in a characteristic of the location of the image, for example a pixel attribute such as intensity or colour. For example, the image gradient is a direction in which the attribute undergoes the greatest rate of change in that location of the image. There may be several image gradients at a given location, for example an intensity gradient and a colour gradient. The image gradients of different attributes may not point in the same direction. In such cases, a dominant gradient direction at the location in the image may be used. The dominant gradient direction can be selected as the direction of the steepest gradient (i.e. the greatest rate of change) or as the direction of the gradient of a selected characteristic, such as intensity. The gradient may be a local gradient for the area of the image under test. For example, where the sampled points are distributed across an area, A, the image gradient of that area, A, can be determined. The determination of an image gradient is within the knowledge of one skilled in the art of image processing and need not be discussed in detail here. The gradient determined for a particular region of an image will be the same, relative to the pixels of that region, irrespective of how that region is oriented in the image. Hence, as that region of the image rotates, for example between successively captured images, the image gradients will differ relative to the orientation of the image. Thus the measures of rotation will correspondingly differ between these images. The orientation of the image is defined by the grid of pixels forming the image. The image gradient can be used to generate a rotation-invariant feature descriptor, as will now be explained.

Once the image gradient (for example the local image gradient) has been determined, the image can be rotated so as to orient the gradient in a known direction, for example along the positive y-axis. The image can be rotated in any convenient manner. For example the image can be rotated by determining new pixel coordinates (i.e. rotated pixel positions) for each pixel of the unrotated image in the region of the feature descriptor pattern. Rotating the image may include determining new pixel values at the rotated pixel positions. The feature descriptor pattern can then be applied at this new orientation of the image. Alternatively, and equivalently, the feature descriptor pattern may be rotated before being applied to the unrotated image, which may lead to a more efficient implementation. The orientation of the image with respect to the feature descriptor pattern ensures that, however a region of an image is initially oriented, the feature descriptor pattern can be applied in a consistent manner, i.e. at the same orientation with respect to the image content of that region of the image. This enables a more accurate comparison of feature descriptors to be carried out, which does not depend on the orientation of the image feature in the image. In this way, the feature descriptor should not depend on the orientation of the image, or of the feature in the image, so can be said to be rotation-invariant.

The conventional approach involves two sampling processes, as will be discussed with reference to FIG. 2. The first sampling process samples values from a region of an image so as to determine the measure of rotation of that region of the image. The second sampling process samples values from a region of the image so as to determine a feature descriptor for that region. There is no need for the sampling patterns for the two sampling processes to be the same. Indeed, there is no need for the size of the image regions sampled in each process to be the same. The pattern used in the initial sampling process can be called a gradient sampling pattern, as it permits determination of the gradient of the sampled region.

Figure 2:
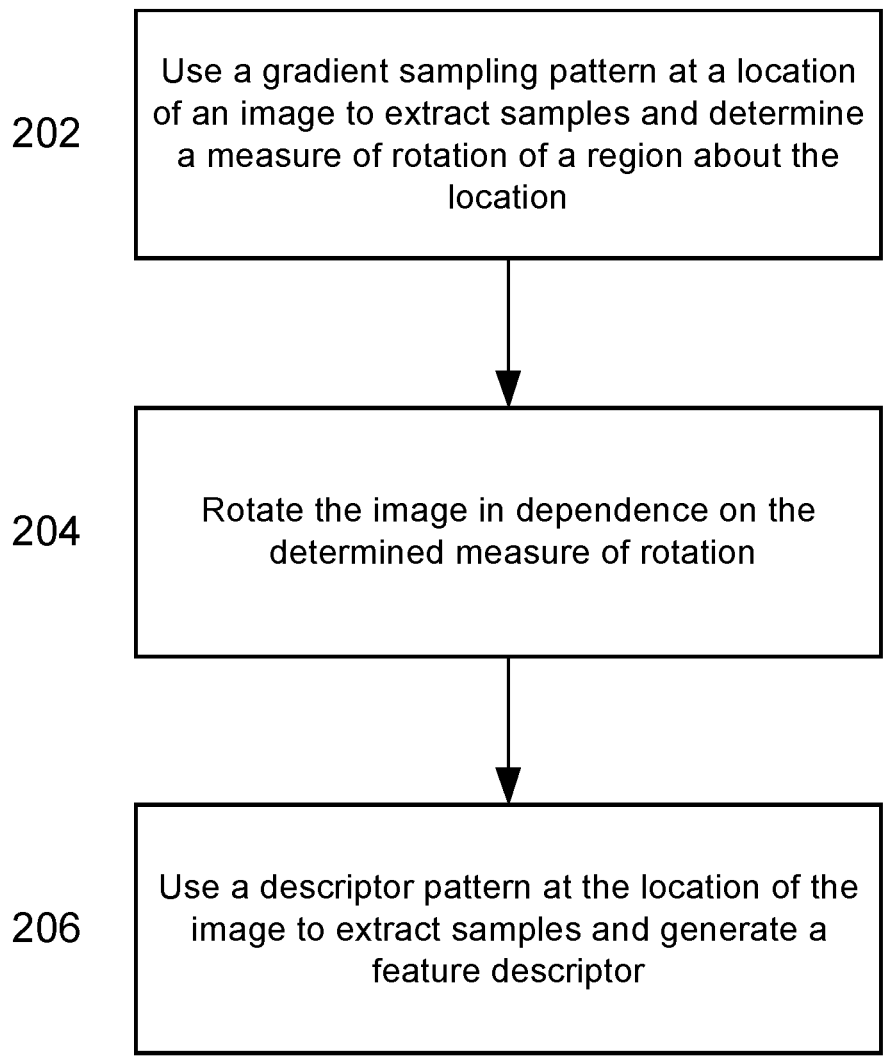
FIG. 2 shows a flow chart of a process for generating a feature descriptor.

With reference to FIG. 2, the gradient sampling pattern is applied at a desired location in an image 202. Based on the sampled values, a measure of rotation (such as a gradient) can be determined for a region about that location. For example, where the gradient sampling pattern is circular and is centred on the desired location, the determined gradient will be in respect of the region covered by the circular sampling pattern which is centred on the desired location. A rotation is then performed, by an angle in dependence on the determined measure of rotation 204, for example by an angle determined to be the measure of rotation, so as to orient the sampled image region consistently with respect to the feature descriptor pattern. The descriptor pattern is then applied to the location in the image 206. Samples are extracted from the image according to the descriptor pattern, and a feature descriptor is generated based on, for example, a pair-wise comparison of the values of the extracted samples, as discussed above.

The present inventors have realised that the above approach can be wasteful in terms of processing cost and the amount of data read from memory (which may be referred to as "memory bandwidth" herein) because, to generate the rotation-invariant feature descriptor, two sampling processes are required. The set of samples extracted in the first sampling process are used to determine a measure of rotation of a region of an image, and are then discarded. The present inventors have realised that the samples used to determine the measure of rotation can also be used to determine the rotation-invariant feature descriptor. This saves the processing cost and memory bandwidth of the second sample extraction process, which can in some cases effectively halve the processing cost and memory bandwidth associated with feature descriptor generation. Thus the approach described herein can lead to a significant reduction in the processing cost and memory bandwidth of the technique, whilst maintaining a good level of accuracy. Significant reductions in the overall processing cost and memory bandwidth can be achieved because the processing cost and memory bandwidth associated with extracting the samples is high compared to the processing cost and memory bandwidth of the rest of the feature descriptor generation process. The processing cost of sample extraction is higher than that of comparing feature descriptors, for example. An initial sample extraction process is performed to permit determination of the measure of rotation. The subsequent generation of the feature descriptor can be performed without needing to perform further sample extractions. This will be explained in detail below. Thus the processing cost associated with these further sample extractions can be saved/avoided.

In the sample extraction process, a relatively large amount of data will need to be processed and/or transferred, for example data permitting the filtering of the area local to each sampling point. For example, where a sampling point is based on a filter that covers, say, 15 pixel locations, values such as attribute values (e.g. intensity values) for each of those 15 pixels will need to be processed and/or transferred. The transfer of this data takes up system bandwidth. In the present techniques, avoiding subsequent sample extraction processes can avoid the bandwidth requirement associated with such sample extraction processes.

In the situation above where a feature descriptor is to be generated using the same set of samples as extracted during the image orientation process, the measure of rotation can be generated by performing a sample extraction process. The feature descriptor can then be generated without performing a sample extraction process. Thus the bandwidth saving can approach half of the bandwidth which would otherwise be required (since only one rather than two sample extraction processes are performed). Similarly, the processing cost of generating the feature descriptor can be halved, or reduced, e.g. by approximately half.

In other examples, where feature descriptors for a particular feature are to be generated at different relative orientations of the image region and the descriptor pattern, the potential savings, in processing cost and/or bandwidth requirement, can be greater than those in the example given in the paragraph above. To take a simple example, where ten feature descriptors, each in respect of a particular feature, are to be generated at successively rotated orientations, only one out of a possible ten sample extraction processes are required. This could lead to a processing and/or bandwidth reduction of 90% (or an amount approaching 90%, since in practice there is likely to be some processing and bandwidth requirement, but at a much lower level). This can therefore speed up the processing of the feature descriptors and thus the matching process overall.

Figure 3:
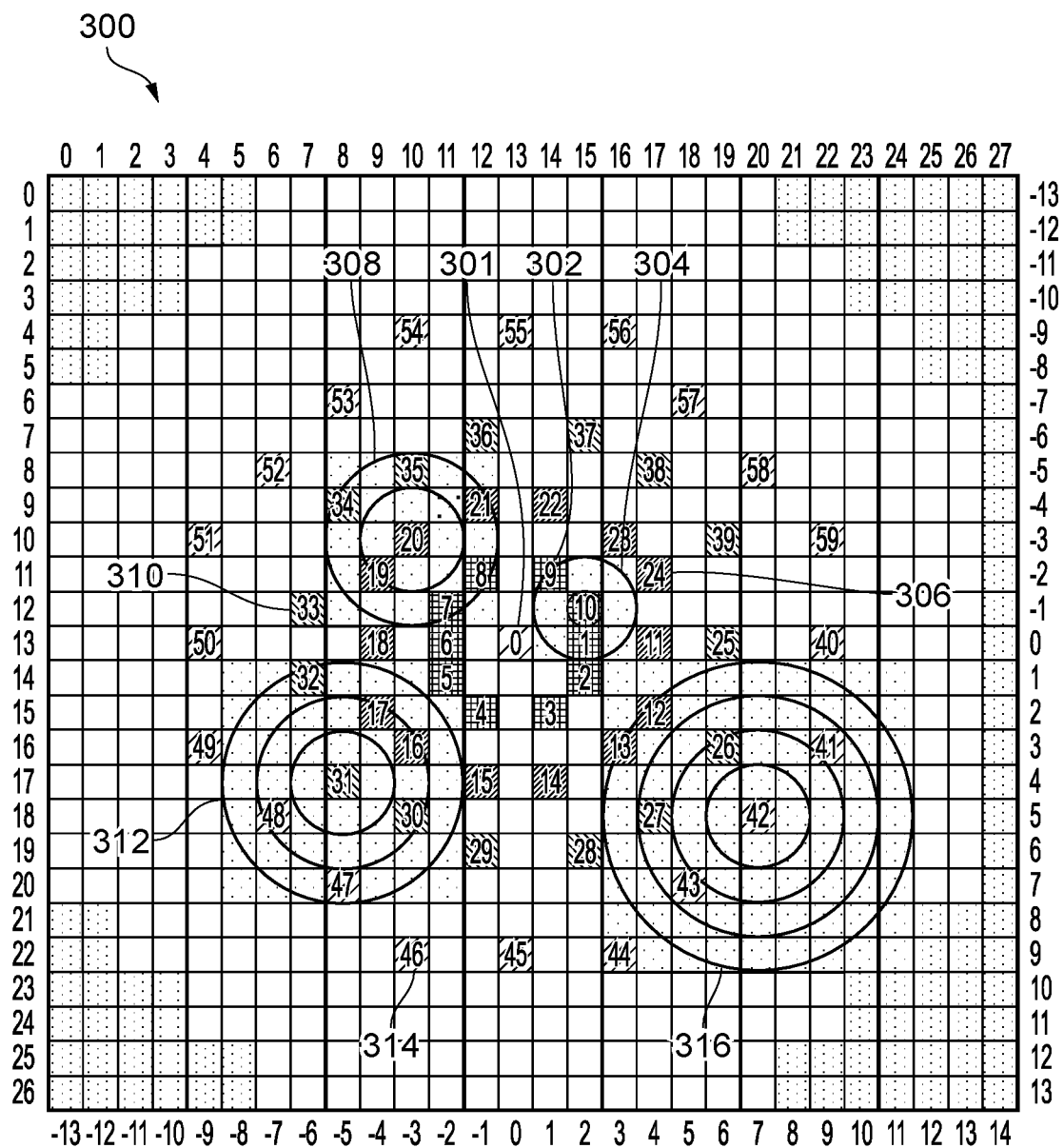
FIG. 3 shows an example of a feature descriptor pattern.

FIG. 3 illustrates a descriptor pattern that can be used in the present techniques. The present techniques are not limited to this descriptor pattern, as will be explained below. However, the following discussion will provide an explanation using this pattern as an example.

In this descriptor pattern, a central sampling point 301 (labelled '0') is surrounded by four rings 302, 306, 310, 314. Sampling points on the innermost ring (the first ring 302) are labelled '1' to '10'; sampling points on the next innermost ring (the second ring 306) are labelled '11' to '24'; sampling points on the next innermost ring (the third ring 310) are labelled '25' to '39'; sampling points on the outermost ring (the fourth ring 314) are labelled '40' to '59'. In this example, there are 60 sampling points in total. In other examples, the number of sampling points can differ. More or fewer sampling points can be used.

The values sampled at each sampling point may be the value of the pixel with which the sampling point is co-located, for example the value of a given or pre-determined pixel attribute, such as the intensity or colour value (for example RGB or YUV) or local gradient of that pixel. Where the sampling point does not align with a single pixel, the value sampled at that sampling point may be some combination, such as an average or an interpolation, of the values of two or more neighbouring pixels. Such combinations, including averaging and interpolation, can be calculated using well-known methods.

In FIG. 3, the sampling points are shown as being co-located with pixel positions (the square grid). This need not be the case. In preferred examples, the sampling points are permitted to fall between pixel positions, e.g. such that they can be evenly distributed around the rings. The sampling points are shown as being co-located with pixel positions in FIG. 3 for ease of understanding. Integer locations, for example locations aligned with pixel positions, may be faster and/or simpler to sample. However, integer sample locations may also result in sampling the image at non-integer pixel positions, if the feature location itself is non-integral.

The values sampled at each sampling point may be dependent on an area surrounding the respective sampling point. In one example, as illustrated in FIG. 3, a filter can be applied at the respective sampling points. The circles centred on pixels labelled '10', '20', '31' and '42', i.e. circles 304, 308, 312 and 316, represent the extent of the filters. As illustrated, the filters are circularly symmetric filters, but this need not be the case. The filters may comprise low-pass filters. The filters may comprise Gaussian filters. The size of the circles 304, 308, 312 and 316 may represent the standard deviation of the Gaussian filter applied at the respective sampling points. In another example, the filters are box filters. A box filter can provide an approximation to a Gaussian filter; use of a box filter can be quicker than use of a Gaussian filter. Thus the processing cost and time can be reduced by using box filters rather than Gaussian filters. The filter used, whether Gaussian, box or another known filter, can be selected in dependence on system requirements, for example speed, filter behaviour and/or performance and/or bandwidth. Using a filter permits the sampling to take account of the area of the image local to the sampling point itself.

The extents of the filters illustrated in FIG. 3 are representative of the filters applied to each sampling point in the rings. Only one illustrative filter extent is shown in respect of each ring. In practice, each sampling point in a given ring will be sampled using a filter of the same extent.

No circle corresponding to a filter extent is shown in respect of the central sampling point in FIG. 3, i.e. the pixel labelled '0'. In this example, the descriptor pattern is centred on a given pixel, and the desired attribute value of that pixel is used as the sampled value for the central sampling point. The central sampling point may align with a single pixel, as illustrated. However, this is not necessary, since the value sampled at the central sampling point can also be obtained by a local averaging or interpolation or filtering, as described above. The remaining sampling points will not necessarily be aligned to pixel locations. Hence, whilst other sampling points may also be pixel-aligned, this is not necessary.

Referring again to FIG. 3, the size of the filter extent differs between each ring. The filter extent 304 of the first ring 302 is the smallest. The filter extent 308 of the second ring 306 is next largest. The filter extent 312 of the third ring 310 is next largest from the filter extent of the second ring. The filter extent 316 of the fourth ring 314, i.e. the outermost ring, is the largest. The extent of the filters need not increase radially from the centre of the descriptor pattern. Filter extents for different rings may be the same. The filter extent for a radially-inner ring may, in some examples, be larger than that for a radially-outer ring.

In the descriptor pattern configuration shown, the density of sampling points decreases on successive rings going away from the central sampling location. This is because the circumference of the rings increases. In the illustrated configuration, whilst the number of sampling points increases for the larger rings, the average density of points still decreases, due to the size of the ring and the number of sampling points. This particular relationship between the size of the ring (or the number of the ring going outwards from the central sampling point) and the density of sampling points on that ring need not always hold. In other examples different relationships are possible. For example, the density of sampling points may remain the same, or substantially the same, on successive rings. It is also possible for the density of sampling points to increase on successive rings, proceeding outwards from the centre.

In the example illustrated in FIG. 3 it can be seen that the extents of the filters used 304, 308, 312, 316 are large enough to cover sampling points on the same ring as the sampling point under consideration, to either side of that sampling point. For example, the extent of the filter about the sampling point labelled '10' on the first ring 302 covers the adjacent sampling points on that ring: sampling points labelled '1' and '9'. Similarly, the extent of the filter about the sampling point labelled '31' on the third ring 310 covers the adjacent sampling points on that ring: sampling points labelled '30' and '32'. The same is true for the sampling points on the second ring 306 and the fourth ring 314.

In general, the filter may be of sufficient extent to cover at least one neighbouring sampling point on the same ring. In some examples, the filter is of sufficient extent to cover two neighbouring sampling points on the same ring, one to either side of the sampling point under consideration.

It is not necessary for the extent of the filter to cover a neighbouring sampling point. However, it is useful if the extents of the filters for neighbouring sampling points overlap one another. This will be the case where the filter extent itself covers the neighbouring sampling point, but it can also be the case where the filter extent does not cover the neighbouring sampling point. For example, where the filter extends by more than half of the distance between neighbouring sampling points, the filters will overlap.

The present inventors have realised that this is beneficial since this overlap in the extents of the filters means that the values sampled in this way will vary smoothly between the sampling points, i.e. there should be a continuous change in the sample values between neighbouring sampling points. Hence, the sampled values will vary smoothly or continuously between sampling points along the same ring (i.e. in a circumferential direction) where the extent of the filters for those sampling points overlap one another.

In a similar manner, the present inventors have realised that it is beneficial for the extent of the filters to also overlap one another between at least two of the rings. This means that the values sampled will vary smoothly or continuously between sampling points in those adjacent rings (i.e. in a radial direction). This is illustrated in FIG. 3, where it can be seen that the filter extent 312 of the filter centred on the pixel location labelled '31' would overlap the filter extent of a filter centred on the pixel location labelled '16': compare the extent of filter 312 with that of filter 308.

Preferably the extent of the filters is sufficient for the filters to overlap with filters of neighbouring sampling points both along the same ring and between adjacent rings. This is illustrated in FIG. 3 where, for example, the filter extent 308 of the filter centred on the pixel location labelled '20', which is on the second ring 306, covers both neighbouring sampling locations on the same (second) ring, i.e. locations labelled '19' and '21', and neighbouring sampling locations on a radially inner ring (the first ring 302: locations labelled '7' and '8') and a radially outer ring (the third ring 310: locations labelled '34' and '35'). Since this filter extent overlaps the other sampling points, it will overlap the filters centred on those sampling points. As mentioned above, it is not necessary for the filter extent to overlap the other sampling points themselves in order for it to overlap the filters centred on those sampling points. Thus, filters smaller than those shown in the illustrated example can still obtain these benefits.

In the situation described above with reference to FIG. 2, where samples are initially extracted according to a gradient sampling pattern to determine a measure of rotation of a region of an image, and samples are subsequently extracted according to a descriptor pattern to determine a feature descriptor, the gradient pattern and descriptor pattern need not be the same. In the present techniques, where a set of extracted samples is to be used to determine the measure of rotation and the same set of extracted samples is to be used to determine the feature descriptor, it is convenient (although not necessary) for the descriptor sampling pattern to be used to extract the samples from the image.

Samples can be extracted from the image using the descriptor pattern at an initial orientation relative to the image, for example as illustrated in FIG. 3. The extracted samples form a set of initial samples. The extracted samples, or set of initial samples, characterise the location, at which the descriptor pattern is centred, at the initial orientation.

The set of initial samples can be used to determine the measure of rotation in respect of the sampled region of the image. The measure of rotation, for example a dominant gradient direction of the sampled region, can be determined in any convenient manner. The measure of rotation may be an angle, $\alpha$, relative to the orientation of the image as sampled. The angle may be determined from a determined gradient such as the dominant gradient direction for the sampled region. For example, the angle, $\alpha$, may be determined relative to the positive y-axis of the image such that where the gradient points along the positive x-axis, the angle can be determined to be 90 degrees, and where the gradient points along the negative x-axis, the angle can be determined to be 270 degrees, and so on.

Figure 4:
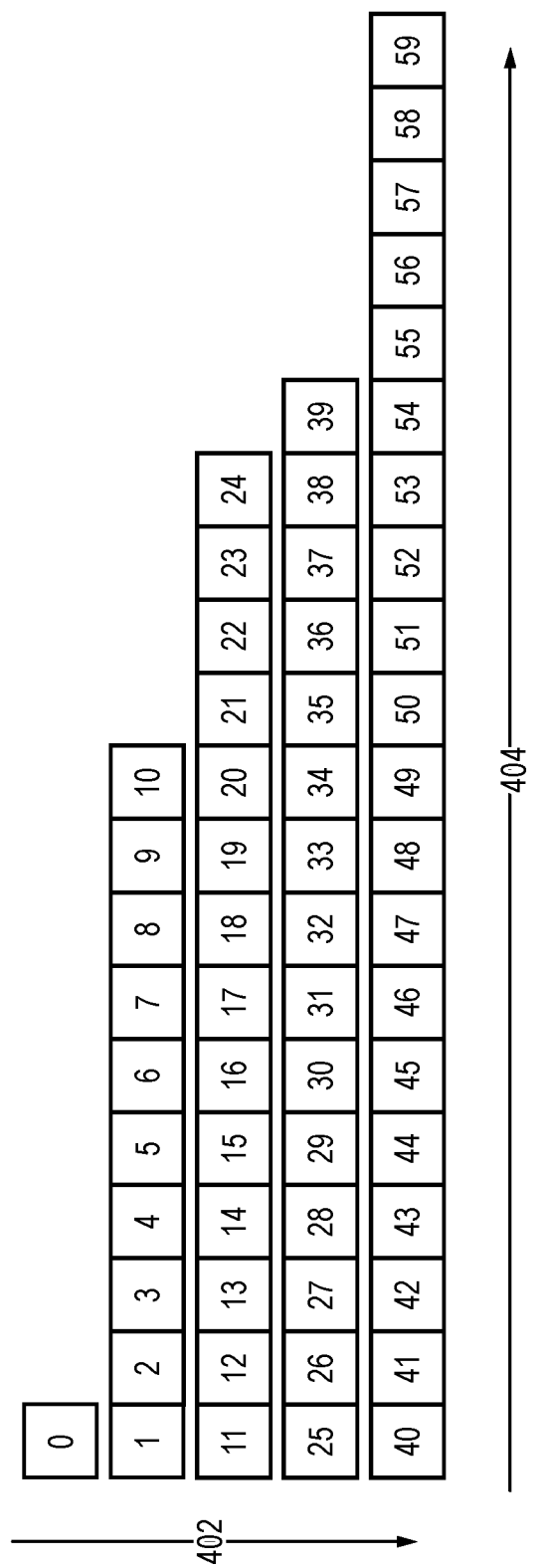
FIG. 4 shows an example of an array of samples obtained using the descriptor pattern illustrated in FIG. 3.

In the illustrated example, there are 60 sampling points in the descriptor pattern. An array can be formed which comprises the extracted samples. In this example, the array comprises 60 elements. Referring to FIG. 4, the array can be a linear array, comprising elements that have been sampled from locations labelled '0' to '59'. Note that the array will not contain the numbers 0 to 59; the labelling in FIG. 4 is to show the correspondence with the elements of the array and the descriptor pattern. The array element '0' comprises the extracted sample value from the location labelled '0' in FIG. 3, and similarly for the remainder of the array elements. The array elements may comprise a combination of values, for example more than one value. An example of this is where the extracted value is an RGB colour value. The array element can comprise multiple values of the RGB value, i.e. values for red, green and blue colour channels.

Note that the linear array illustrated in FIG. 4 has been split over five lines to show the correspondence with the central sampling location and the four rings. This can also be seen by comparing the numbers shown at each array element in FIG. 4 with the sampling location labels in FIG. 3. Such a splitting of the array is for illustrative purposes only, and does not imply that separate arrays are needed.

It is not necessary to sample the image a second time, or subsequent times, to be able to generate a rotation-invariant feature descriptor, i.e. a feature descriptor that characterises the location in a consistent manner irrespective of the rotation of the image region, as discussed herein. Instead, the feature descriptor can be generated in dependence on the set of initial samples, or the samples extracted (e.g. using the descriptor pattern) at the initial orientation. In this way, the sample extraction process need only occur once. This results in a processing saving and a memory bandwidth saving, since subsequent extraction processes are not required. The generation of the feature descriptor from the set of initial samples is performed so as to take into account the angle $\alpha$ (the measure of rotation). Thus, the feature descriptor can be generated such that the feature descriptor itself is (at least approximately) the same as would occur where a second sampling process was to be performed at a rotated orientation relative to the image.

The feature descriptor can be generated by sampling from the set of initial samples, for example from the array in which the set of initial samples are stored, rather than from the image itself. At least two approaches are possible. In one approach, elements of the array in which the set of initial samples are stored can be shifted so as to generate a modified array (such as a shifted array). In another approach, interpolation can be performed on elements of the array to generate a modified array (such as an interpolated array). A combination of these approaches is possible. Elements of the modified array can be used in, for example, pair-wise comparisons to generate the feature descriptor. These approaches will be described in more detail below.

The modified array, on which the feature descriptor is based, can be generated by sampling from the array comprising the set of initial samples. It is not necessary to perform additional filtering on the values of this array (although this could be done). The array can be stored in system memory, for example locally to the feature descriptor processor (i.e. a processor configured to perform feature descriptor generation and/or matching). Such an array can be small (in the illustrated example it need only store 60 elements), and so will not use much memory space. Memory usage by storing the array is highly likely to be outweighed by the benefits, including those discussed above.

Once a feature descriptor has been generated, based on the modified array, it can be used in a descriptor comparison. The feature descriptor can be stored; intermediate values, for example the contents of the arrays, need not be stored. Discarding such intermediate values can save memory space. In some examples, the intermediate values are not needed to generate feature descriptors for further features in the image. However, further feature descriptors for the same feature location in the image can be generated, if required, by further sampling from the array comprising the set of initial samples so as to form further modified arrays on which respective feature descriptors can be based.

Figure 5:
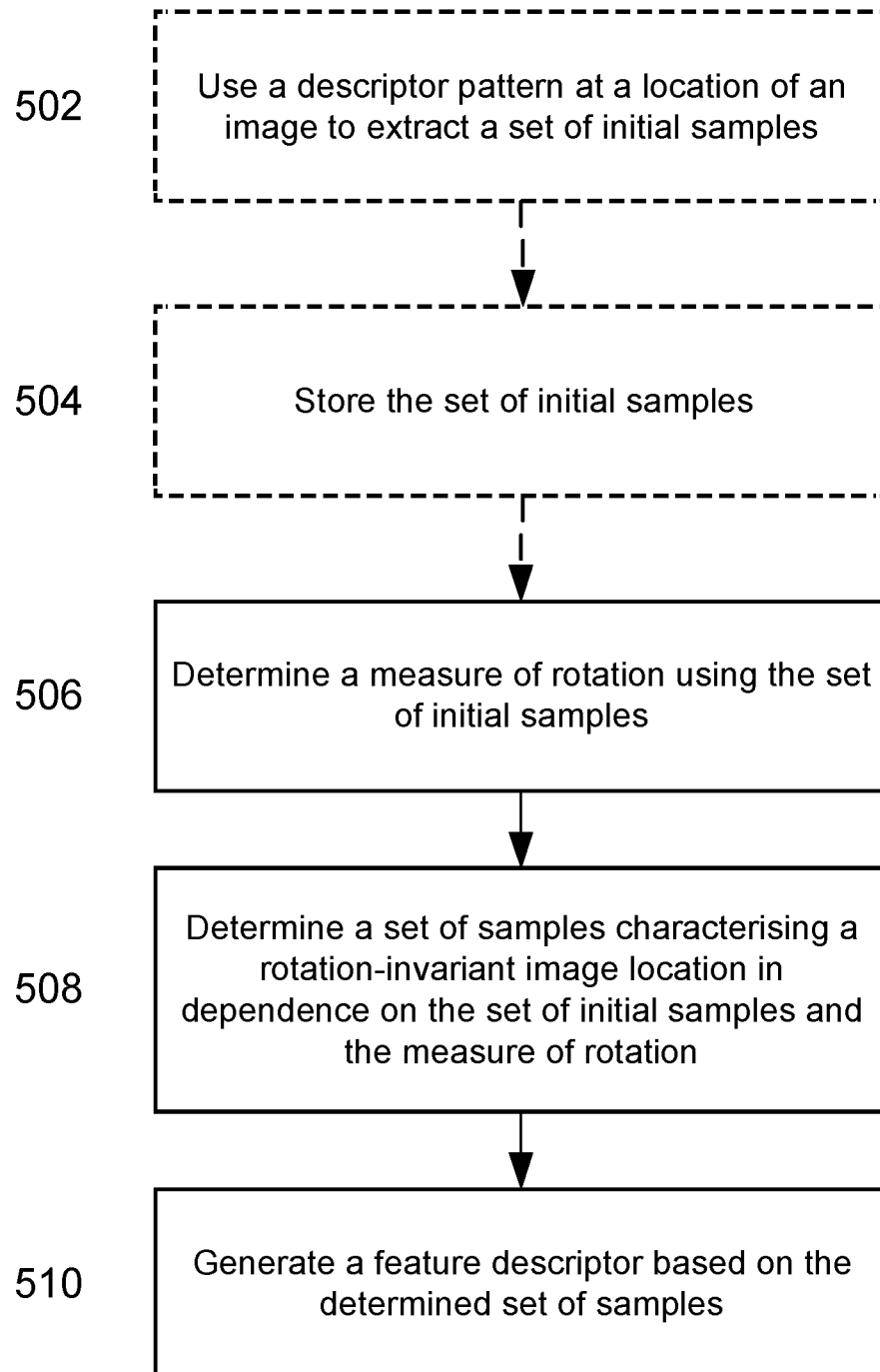
FIG. 5 shows a flow chart of an example process for generating a feature descriptor.

The process of generating a feature descriptor will now be described with reference to FIG. 5. The process optionally comprises using a descriptor pattern at a location in an image to extract a set of initial samples 502. The set of initial samples may be stored 504. The set of initial samples can be stored in an array. A measure of rotation of a sampled image region is determined in step 506. The measure of rotation is determined in dependence on the set of initial samples, i.e. the elements of the array. This measure of rotation is typically an angle between a characteristic direction of the image region (such as a gradient) and the orientation of the image. Determining how the characteristic direction of the image region relates to a known direction, for example the positive y-axis, permits the descriptor for the region of the image to be rotation-invariant, i.e. it does not matter what the original orientation of the region is within the image, the orientation can be determined and accounted for in a consistent manner in the generation of the descriptor. This permits a more consistent (i.e. rotation-invariant) comparison of the image regions. In some examples, a set of samples characterising the image location in the image is determined in dependence on the measure of rotation determined at 506 and the set of initial samples 508. The set of initial samples can form an array. Samples can be extracted from the array and processed (e.g. by performing interpolation) so as to form a modified array. The elements of the modified array can form the set of samples characterising the image location in a rotation-invariant manner.

The process generates a feature descriptor in dependence on the determined set of samples 510, for example in dependence on the modified array.

Shifting Array Elements

In one approach, elements of the array can be shifted (e.g. cyclically shifted) to generate a modified array, based on which the feature descriptor can be generated, for example by the pair-wise comparison approach discussed herein. The shifting of the elements can be such as to represent (or approximately represent) a relative rotation between the descriptor pattern and the image, for example a rotation corresponding to the measure of rotation. The elements can be shifted along that portion of the array corresponding to the ring on which the elements are located. For instance, the central sampling point will be the same at all rotations (since, in the illustrated example, the descriptor pattern would be rotated about the central sampling point). The central sampling point is therefore not shifted. Thus, denoting the array comprising the set of initial sampling points as "Initial [0:59]" and the modified (or shifted) array representing the relative rotation as "Rotated [0:59]", it can be seen that Initial [0]=Rotated [0]

The remaining elements are shifted in a circular manner along their respective rings. In the example illustrated in FIG. 4, the first ring 302 is represented by Initial [1:10]. The second ring 306 is represented by Initial [11:24]. The third ring 310 is represented by Initial [25:39]. The fourth ring 314 is represented by Initial [40:59]. Circularly shifting elements within these rings means that, for a single shift (treating the rings separately for illustration):

Ring 1: Rotated [1:10]=Initial [10, 1:9]
Ring 2: Rotated [11:24]=Initial [24, 11:23]
Ring 3: Rotated [25:39]=Initial [39, 25:38]
Ring 4: Rotated [40:59]=Initial [59, 40:58]

This implies a quantisation of available rotations of the descriptor pattern for generating the feature descriptors. Again, taking each ring separately, there are 10 possible rotations of the first ring, 14 possible rotations of the second ring, 15 possible rotations of the third ring and 20 possible rotations of the third ring.

Thus a single shift in each ring would correspond to a different angular rotation of the descriptor pattern: in the example of FIG. 3, a shift along each of the first, second, third and fourth rings of one element corresponds to approximate angular rotations of 36, 26, 24 and 18 degrees, respectively. The angular rotations are approximate at least in that the sampling points may not be aligned exactly along a circle, and the sampling points along each ring may not be equally angularly spaced about that ring. In practice, it is desirable to effectively rotate each of the rings by the same angle. Shifting elements along the array corresponding to the same angular rotation of each of the rings will lead to a more accurate result. However, the present inventors have found that even where different effective angular rotations are effected between rings, the resulting feature descriptor is still usefully able to determine feature matches in images. Thus, this approach, which can be performed at a reduced processor load, has been found to be beneficial.

In one example, the number of sampling points in each ring can be an integer multiple of the number of sampling points in radially inner rings. Hence the number of sampling points in the second ring can be the same as the number in the first ring, or twice the number in the first ring, etc. Thus a shift in one sampling point position in the innermost ring will correspond to a shift in one or more whole sampling point positions in outer rings. Thus, for a shift of an arbitrary number of sampling point positions in the first ring, there will be corresponding shifts possible in the sampling point positions of the other rings that maintain the geometric pattern, i.e. the pattern will be rotated as a whole rather than being distorted.

This example restricts the number of rotations available to the number of sampling point positions in each ring, with one of these positions being at the initial orientation. This would mean that the possible rotations are quantised accordingly. The desired rotation of the descriptor pattern is given by the measure of rotation, e.g. as determined from the initial samples. A rotation may be selected from the quantised set of possible rotations by selecting the one of the possible rotations which is closest to the desired rotation. Where the number of possible rotations differs on different rings, a different rotation may be selected for each ring, such that each selected rotation is the one closest to the desired rotation.

In an alternative, values at possible sample points in the outer rings which might be between sample point positions in those rings can be obtained by averaging or interpolating (e.g. using linear interpolation or some higher-order interpolation) between values at the sample point positions. This may relax the requirements on the number of sampling point positions in the outer rings while also avoiding the need to quantise the possible orientations of the descriptor patterns.

In another example, to avoid the number of sampling point positions in the innermost ring causing a quantisation of the possible rotations available, values at possible sample points in one or more rings can be obtained by averaging or interpolating between values at the sample point positions.

To illustrate the above, consider an example descriptor pattern comprising two rings; the inner ring has 10 sampling point positions and the outer ring has 20 sampling point positions, forming a 31-element array (Example_Array [0:30]) as follows:

Central sampling point: Example_Array [0]
Inner ring: Example_Array [1:10]
Outer ring: Example_Array [11:30]

A modified array can be generated by sampling from Example_Array as indicated in the following. A first modified array, Array1, at an effective relative rotation of 36 degrees to the initial orientation, can be generated by shifting the elements corresponding to the inner ring by one position, and shifting the elements corresponding to the outer ring by two positions:

Central sampling point: Array1 [0]=Example_Array [0]
Inner ring: Array1 [1:10]=Example_Array [10, 1:9]
Outer ring: Array1 [11:30]=Example_Array [29:30, 11:28]

A second modified array, Array2, at an effective relative rotation of 72 degrees to the initial orientation, can be generated by shifting the elements corresponding to the inner ring by two positions, and shifting the elements corresponding to the outer ring by four positions:

Central sampling point: Array2 [0]=Example_Array [0]
Inner ring: Array2 [1:10]=Example_Array [9:10, 1:8]
Outer ring: Array2 [11:30]=Example_Array [27:30, 11:26]

A process of generating a feature descriptor, based on shifting elements in an array, will be described with reference to FIG. 6A. An array shift is determined, from a measure of rotation (for example the measure of rotation determined from the set of initial samples), by which to shift elements in the array 602. The array comprises the set of initial samples. The elements of the array are then shifted based on the determined array shift 604 to form a modified array. The feature descriptor can be generated based on the modified array. It is not necessary for the modified array to be formed. In some examples it is sufficient for the shift of the elements of the array to be used to determine what the pair-wise (or other) comparisons would be between the elements of the modified array, and to generate the feature descriptor in dependence thereon.

A third modified array, Array3, at a relative rotation of 18 degrees to the initial orientation, can be generated by averaging (i.e. interpolating at a mid-way point) the values of elements corresponding to the inner ring at a given position and a neighbouring position, and by shifting the elements corresponding to the outer ring by one position, as illustrated in the following:

Central sampling point: Array3 [0]=Example_Array [0]
Inner ring: Array3 [1:10]=Example_Array [½(10+1), ½(1+2), ½(2+3), . . . , ½(9+10)]
Outer ring: Array3 [11:30]=Example_Array [30, 11:29]

A process of generating a feature descriptor, based on interpolating values of elements in an array, will be described with reference to FIG. 6B. Interpolations to perform using values of the elements in the array are determined from a measure of rotation (for example the measure of rotation determined from the set of initial samples) 610. The array comprises the set of initial samples. The determined interpolations are then performed using values of the elements in the array 612. The results of the interpolations can form a modified array. The modified array may be stored at least temporarily. It may be determined that a set of interpolations is to be performed, where the set of interpolations uses each of the values of the elements in the array. The determined set of interpolations may be performed using each of the values of the elements in the array. The feature descriptor can be generated based on the modified array. For example, the interpolation (e.g. representing a rotation) of each ring can be performed as a set of operations. All of the elements of the array may be used when performing the set of operations. There may be the same number of elements in the modified array as there are in the array on which the modified array is based.

These simple examples are illustrative. Other rotations are possible, as will be appreciated, and different interpolation factors can be used to determine values at arbitrary positions between sample positions of the set of initial samples.

Referring again to FIGS. 3 and 4, the extracted array has 60 elements, i.e. Initial [0:59]. There are five notional sets of samples in this array: in respect of the central sampling point (Initial [0]), the first ring (Initial [1:10]), the second ring (Initial [11:24]), the third ring (Initial [25:39]) and the fourth ring (Initial [40:59]). Apart from the central sampling point, each of the four other notional sets can be called a 'vectorised circle'. To estimate values on the basis of which a feature descriptor can be generated (generating an estimation for a second sample extraction), values can be at least one of shifted and interpolated around the circumference of each vectorised circle.

For example, using the set of initial samples obtained by performing the initial sample extraction, a measure of rotation can be determined. This angle (in, for example, degrees or radians) can be converted into another unit based on dividing a circumference of each circular ring into a number of circumferential portions (or "arcs"). The number of circumferential portions may be dependent on the number of elements in each vectorised circle. Thus, in the illustrated example, the first ring comprises 10 circumferential portions, the second ring comprises 14 circumferential portions, the third ring comprises 15 circumferential portions and the fourth ring comprises 20 circumferential portions.

For each vectorised circle, the equivalent values of a further 'sample extraction' (i.e. values estimated in dependence on the set of initial samples) are obtained by finding how many positions along the array to shift the circumferential portions. The number of positions by which to shift the circumferential portions is a real number. A linear interpolation may be used between the values of two adjacent sections to approximate the desired value at the desired sampling point between two adjacent sampling points of the set of initial sampling points.

For example, referring to FIG. 3, the angular separation between sample points in the first ring is 36 degrees (360/10), on average. To generate a modified array for an effective angular rotation of a degrees (e.g. 15 degrees), interpolations can be performed between adjacent sample points in each vectorised circle. For instance, taking a rotated sampling location that corresponds to a 15-degree clockwise rotation from Initial [8], it can be seen that this will be an interpolation between the value of Initial [8] and Initial [9]. A rotated sampling location corresponding to a 15-degree clockwise rotation from Initial [21] will be an interpolation between the value of Initial [21] and Initial [22]. A rotated sampling location corresponding to a 15-degree clockwise rotation from Initial [36] will be an interpolation between the value of Initial [36] and Initial [37]. A rotated sampling location corresponding to a 15-degree clockwise rotation from Initial [54] will be an interpolation between the value of Initial [54] and Initial [55].

As will be understood, with reference to FIG. 4, arrow 402 represents a radial distance from the centre of the descriptor pattern. Arrow 404 represents an angular distance along a ring.

The number of elements along each vectorised circle along which array elements are shifted need not be the same for each ring. The number of elements by which to shift array elements may be determined for each ring in dependence on the measure of rotation. The number of elements by which to shift array elements can be the number of elements corresponding to an angular rotation that is closest to the measure of rotation. For example, in the example of FIG. 3, a single-element shift in the first ring corresponds to an angular rotation of approximately 36 degrees. Similarly, single-element shifts in the second, third and fourth rings correspond to angular rotations of approximately 26, 24 and 18 degrees. Where the measure of rotation is determined to be an angle of 40 degrees, the number of elements along each ring that is closest to 40 degrees can be selected. This number can be selected for each ring separately from the selection for each other ring. In this example, the array elements can be shifted by one element in the first ring (corresponding to 36 degrees), by two elements in the second ring (corresponding to 52 degrees, which is closer to 40 degrees than shifting by one element, which corresponds to 26 degrees), by two elements in the third ring (corresponding to 48 degrees) and by two elements in the fourth ring (corresponding to 36 degrees). The rings of the descriptor pattern can be considered to 'snap' to the closest angular rotation corresponding to the measure of rotation.

Interpolating Array Elements

The following discussion will consider interpolation further. In one approach, values between sampling points in the set of initial samples can be approximated as being on linear segments, or as being on the line of the ring, joining two neighbouring sampling points in the descriptor pattern. In this case, a linear interpolation between the values of two neighbouring samples in the set of initial samples corresponding to the two neighbouring sampling points can be performed.

In another approach, higher order interpolations can be performed, such as a quadratic interpolation or a cubic interpolation. More generally, a polynomial interpolation can be carried out between two or more values of samples in the set of initial samples to generate an element in the modified array for use in generating the feature descriptor.

Since the number of samples considered will increase with the order of the polynomial, a higher-order polynomial can lead to an interpolation result that more closely follows the actual values that the descriptor pattern seeks to sample. In this way, the use of a higher-order polynomial can be said to lead to a more accurate interpolated result. Use of a higher-order interpolation is also likely to increase the amount of computational effort required. This may increase the size of the hardware used to perform the interpolation (e.g. the silicon area) or may increase the power consumption or processing time. The order of the polynomial used in the polynomial interpolation may be selected based on at least one of the speed of obtaining the interpolated result, the size of the hardware used to perform the interpolation, the power consumption of the hardware, and the accuracy (or relative accuracy) of the interpolated result, for example based on a desired trade-off between speed and accuracy.

Any combination of approaches can be used. For example, for a ring with a higher circumferential density of points (i.e. where the points are separated by a relatively lower angular separation) an interpolation along a linear segment can be performed; for a ring with a lower circumferential density of points (i.e. where the points are separated by a relatively higher angular separation) a higher order interpolation can be performed. This approach is useful because where the points are separated by a lower angular separation, a linear segment between adjacent points may be sufficient to closely approximate the values of the image between those points, while where the angular separation is greater, a more expensive higher order interpolation may be required.

Such interpolation between samples of the set of initial samples is useful since, as described above, the set of initial samples can be generated by performing a sample extraction which uses filtering of pixel values in the proximity of sampled points, for example using a filter function that overlaps in the circumferential direction, such as an overlapping Gaussian filter. The values of the extracted samples will therefore also vary smoothly if the positions of the sample points are moved. Thus it is appropriate to interpolate between such smoothly varying values to obtain modified array values for use in generating the feature descriptor.

In the discussion above, values of the modified array are generated by interpolating between samples of the same ring in the set of initial samples. This represents an interpolation between samples at the same radial distance from the central sampling point. It is also possible to interpolate between rings. This represents an interpolation between samples at different radial distances from the central sampling point. The interpolation between rings may be between at least two rings. The at least two rings may be adjacent in the radial direction. Again, this is useful because the set of initial samples is obtained by performing a sample extraction which uses filtering of pixel values in the proximity of sampled points, where the filtering comprises overlapping filters in the radial direction.

It is not necessary for the filter extents to overlap in both the radial and the circumferential directions. In examples described herein, the filter extents overlap in at least the circumferential direction.

In some examples, an interpolation between rings can be between one sampling point on one ring and one sampling point on an adjacent ring. The two sampling points may be at the same (or similar) circumferential position, i.e. at the same angle about the pattern.

In other examples, more than two sampling points can be considered. For instance, an interpolation can be performed between one sampling point on one ring, at an angular position of, say, 5 degrees, and two sampling points on another ring, the sampling points being at angular positions of, say, 0 and 10 degrees. The interpolation between rings may comprise interpolating between a number, $N_1$, of sampling points on one ring and a number, $N_2$, of sampling points on another, radially outer, ring. The one ring and the other ring may be adjacent in the radial direction. $N_1$ and $N_2$ may be the same or they may be different numbers. In some examples, $N_1 < N_2$. The angular range of sampling points on the one ring and the angular range of sampling points on the other ring may be centred on the same (or similar) angular position.

Interpolating between rings can be useful where, for example, the rings are not true circles. In the illustrated example of FIG. 3, the rings are not true circles, but instead the samples are aligned with pixel locations. Adjacent samples within a ring can therefore correspond to different radial distances from the central sampling point. This variation can be determined, and an interpolation performed between rings to account for this radial variation. Thus, the accuracy of the sample estimation can be improved.

Ring Shape

In examples described above, the rings are circular. However, the rings need not be circular. Any suitable shape can be used. For instance, a polygonal ring shape can be used. Where sampling points are taken to be at the vertices of the polygon, this will effectively be the same as taking a circular sampling ring (since the vertices all lie on a circle). A difference will arise where additional sampling points are taken on the polygon between the vertices. In this case, the radial distance of the sampling points from the central sampling point will vary between a maximum at each vertex, and a minimum at the halfway point between adjacent vertices.

Other ring shapes are possible. For instance, an undulating or wavy ring can be used, as illustrated in FIG. 7. The wavy ring may be rotationally symmetric. For example, the wavy ring illustrated in FIG. 7 has rotational symmetry of order 18. To give some examples, the wavy ring may have rotational symmetry at least of order 10, or at least of order 20, or at least of order 30. A higher order of rotational symmetry will mean that the wavy ring can cover an annular area with a sufficient density of sampling points. This can increase the accuracy with which interpolations can be carried out between the sampled points.

In such a wavy ring, or other ring shape departing from a circle, successive sampling points can be located at different radial distances. Use of rings comprising points at different radial distances permits a greater spacing of the rings from one another in the radial direction, whilst still maintaining a good radial density of sampling points. This can increase the likelihood that a radial interpolation result will more closely follow the underlying values sampled at the sampling points, i.e. the radial interpolation accuracy, for a given radial spacing of rings. Thus accuracy can be maintained whilst needing fewer sampling points overall. This can lead to speed increases. In some examples, multiple rings may be used to increase the density of sampling points.

The rings need not all be the same shape. A combination of ring shapes is possible. The ring shapes can be used in any suitable configuration.

The generation of the feature descriptor from the set of samples, for example by pair-wise comparison, may be performed in dependence on the descriptor pattern used, for example in dependence on at least one of the number, shape and spacing of the rings in the descriptor pattern. The pair-wise comparisons that are made may be chosen in dependence on the descriptor pattern.

The sampling points may be equally spaced along each ring. This need not be the case. Sampling points may be equally spaced along at least one ring and not equally spaced along at least one other ring. It may be the case that sampling points are not equally spaced along any ring.

Initial Sample Extraction

In the above discussion, the set of initial samples is formed or obtained by sampling from the image. Pixel attribute values are filtered such that the values of the set of initial samples would vary smoothly if the sample positions were moved.

The initial sample extraction need not be performed on the image. It is possible for the initial sample extraction to be performed on other data, such as pre-filtered data. For example, instead of the initial sample extraction process needing to filter multiple values, it can sample values which have already been filtered. This reduces the amount of processing needed at run time of the descriptor generation process. It can do this by front-loading the computational effort involved in filtering the image, to a stage in the processing before the generation of the feature descriptors. This can result in speed increases when later generating the feature descriptors.

In computer vision, when analysing a scene, it is often not known at the outset what length scales are appropriate to describe the content of the image. For example, whether a particular feature might be expected to occur in a 4×4 pixel region (i.e. at a relatively smaller length scale), or in a 32×32 pixel region (i.e. at a relatively larger length scale). For example, the length scale at which features of interest occur is often not known. Further, objects are often composed of different structures at different length scales. Thus it is appropriate to consider features at different length scales.

The image can be represented by data that considers a plurality of different length scales. The data representing the image can comprise multi-scale data that is representative of the image. The data representing the image may comprise scale-space data. Scale-space data is a set of data at different length scales, in which structures are successively suppressed, or smoothed out, at progressively larger length scales. Data/structures at coarser (i.e. longer) length scales in the scale-space data may be obtained from corresponding data/structures at finer (i.e. shorter) length scales.

For example, consider a three-level set of data, where each pixel in levels above the first level are generated by averaging pixel values in a 2×2 pixel area in the preceding level. Each pixel in the third level corresponds to an area of 4 pixels in the second level and to an area of 16 pixels in the first level. A structure in a 2×2 pixel area in the first level will be smoothed out by the third level (the pixel values of that 2×2 pixel area in the first level contributing only a part of a pixel value in the third level).

Scale-space data may comprise representations of structures or features at length scales between a minimum length scale and a maximum length scale. The scale-space data can be obtained by performing filtering at different length scales, i.e. at the maximum length scale, at the minimum length scale, and optionally at one or more length scales in between the maximum and the minimum.

Filtering at different length scales corresponds to sample extraction in respect of different size rings. As discussed above, sampling on radially inner rings may comprise filtering pixel values surrounding a sample point using a relatively smaller filter size. Sampling on radially outer rings may comprise filtering pixel values surrounding a sample point using a relatively large filter size. The smaller filter size corresponds to filtering at finer detail, i.e. at a smaller length scale. The larger filter size corresponds to filtering at coarser detail, i.e. at a larger length scale.

An example of a scale-space representation of data is a pyramid, such as an image pyramid.

In a pyramid, a signal or image is subjected to repeated smoothing and subsampling. In one example, a pyramid is formed by smoothing an image with a smoothing filter. The smoothed image is subsampled, often by a factor of two. The subsampling may be performed along each coordinate direction. In other examples data at one level in a pyramid can be formed from data in another level in a single-step process. The process is repeated on the resulting image. The process can be repeated many times. Each time the process is carried out, the resulting image is smaller than the preceding image. Succeeding images have decreasing spatial sampling density, i.e. decreased image resolution.

Figure 8A:
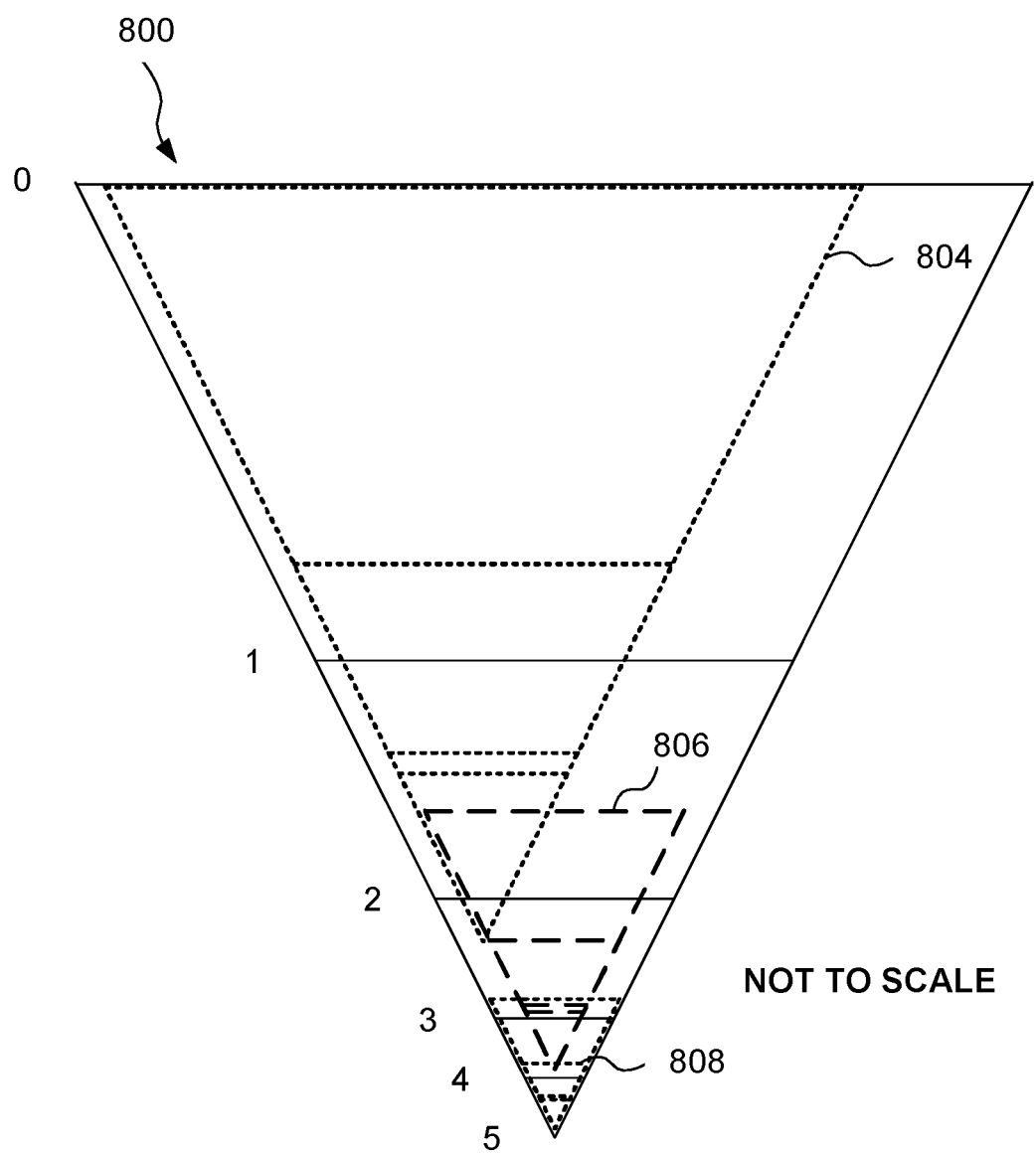
FIG. 8A schematically shows an example of an image pyramid.

An example of an image pyramid 800 is illustrated in FIG. 8A. The first level, level 0, is at the top of the pyramid (as oriented in the figure—i.e. the widest part). Note that FIG. 8A shows a 2D projection of a 3D pyramid. Each level of the pyramid represents an image such as a 2D image; the horizontal line showing each level in FIG. 8A can, conceptually, be thought of as showing an 'end-on' view of that 2D image. The first level, level 0, represents the original image without any smoothing or subsampling. Successively lower levels, i.e. levels 1 to 5, represent successively smoothed versions of the original image, with decreasing resolution at each level down the pyramid. Such pyramids can be formed in one of several known ways. For example, the pyramid can be formed by performing lowpass or bandpass filtering between levels. An example of a pyramid is a Gaussian pyramid. Another example of a pyramid is a Laplacian pyramid. Box filtering may also be used in generating a pyramid. The filter type used will depend on the speed and filter behaviour and/or performance desired.

A pyramid comprises discrete levels of data, representing discrete length scales, rather than a continuum. Thus the pyramid is necessarily an approximation to 'full' scale-space data representing all length scales. Data relating to length scales between those of the discrete levels of the pyramid can be obtained from the levels of the pyramid, for example in a trilinear interpolation. The pyramid is a computationally efficient approximation to full scale-space representation. Use of a pyramid can therefore lead to reductions in processing cost and time.

The following discussion will be made in the context of a pyramid for ease of reference, but it will be understood that in general, a scale-space data representation may be used where appropriate.

The pyramid 800 can be pre-computed for the entire image. This permits sampling from the pyramid when it is desired to sample any particular point at a given length scale. A single sampling point in the descriptor pattern may correspond to a point in the pyramid. A sampling point with a relatively larger filter size will correspond to a point at a lower level in the pyramid (i.e. towards the lower end of the pyramid in the orientation of FIG. 8A, i.e. at a numerically higher level. For example, level 5 is a lower level than level 1) than a sampling point with a relatively smaller filter size. Use of a scale-space representation allows for a fast implementation, when generating feature descriptors. Pre-computing the pyramid for the entire image will incur a certain processing cost. Higher levels of the pyramid (i.e. towards the upper end of the pyramid in the orientation of FIG. 8A, at numerically lower levels) (or more generally, levels of scale-space data with higher resolution) may be expected to be sampled less often than lower levels (i.e. levels with lower resolution). This is because lower levels of the pyramid correspond to sampling of positions in the outer rings of the feature descriptor pattern, where larger filters are used. There are often more sample positions in the outer rings than in the inner rings. At the centre of the feature descriptor pattern, only the single central sample position (301) is unfiltered and will therefore be read from the highest resolution level of the image pyramid. In some situations there may be little or no re-use of data at the higher levels. However, it is likely that there will be re-use of data at lower levels. Thus, pre-computing the pyramid for the entire image up front, without knowing what length scales will be needed, can still result in a computational saving overall. One reason for this is that computation of the higher levels will in any event be needed to compute the lower levels. Sampling data at the lower levels using the pre-computed pyramid avoids the need to compute data at these length scales each time.

When it is desired to sample from the pyramid at a given length scale, data in the pyramid can be sampled that corresponds to that length scale. For instance, where it is desired to sample from the length scale corresponding to level 2 in the pyramid, data corresponding to level 2 of the pyramid can be sampled directly. It is also possible to sample from between discrete levels in the pyramid. For example, if it is desired to sample from a length scale that is between the length scales of levels 2 and 3 of the pyramid, the sampling can be based on data at both levels 2 and 3. For instance, filtering, such as trilinear filtering, can be performed on data points at levels 2 and 3, as would be understood by the skilled person. Such trilinear filtering adds a negligible additional processing cost to the process, since the bulk of the filtering work was done up-front in obtaining the image pyramid itself.

The length scale at which to sample from the scale-space data, or pyramid, can be selected in dependence on the filter extent, i.e. the size of the filter applied around the sample point.

Where the central sampling point is directly sampled, i.e. only one pixel value is sampled, this may correspond to an unfiltered pixel, e.g. at level 0 in the pyramid. Sampling using a filter that covers more pixels will correspond to filtered pixels, i.e. at lower levels (levels 1, 2, 3, and so on) in the pyramid. Where a filter extent covers, say, 4 pixels in one direction, the filter may correspond to level 2 in the pyramid. Where another filter extent covers, say, 8 pixels in one direction, the filter may correspond to level 3 in the pyramid. In an illustrative example, sampling for a point that lies on the first ring can comprise sampling from a higher level in the pyramid, such as level 1; sampling for a point that lies on a radially outer ring, such as the third ring, can comprise sampling from a lower level in the pyramid, such as one of levels 2 to 5 in the example illustrated in FIG. 8A. This is the case where the filter extents increase with radial distance of the ring from the centre. This need not be the case in all examples.

In the pyramid 800, as illustrated in FIG. 8A, the horizontal position at which to sample a value will depend on the desired location in an image at a given length scale, and the vertical position at which to sample a value will depend on the desired length scale. In practice, since the pyramid is likely to be a 3D pyramid, the 'horizontal' position is a position in the horizontal plane.

In a similar manner to considering scale-space representation of data as an image pyramid, the feature descriptor pattern, used to sample from the pyramid, can be considered to be a "descriptor pyramid". An example of a descriptor pyramid 810 is given in FIG. 8B. Whilst the levels of the descriptor pyramid may correspond to the levels in the image pyramid (the vertical separation between two levels may be half the preceding vertical separation), this need not be the case. In the example illustrated in FIG. 8B, the levels are irregularly spaced. The spacing of the levels depends on the extents of the filters used in the descriptor pattern. FIG. 8C shows a schematic example of a descriptor pattern 820

(the rings of which are shown as dashed lines), and illustrative filter extents at each ring (solid circles). The sampling points are not shown. A correspondence between the filter extents and the levels in the descriptor pyramid is shown by the dotted arrows 830. In general, the filter sizes used for successive rings in the descriptor pattern need not increase by a factor of two each time. Thus, levels in the descriptor pyramid may correspond to fractional levels in the image pyramid. The order of the rings, moving radially outwards from the centre of the descriptor pattern need not correspond to the order of the levels in the descriptor pyramid. The order of the rings will correspond to the order of the levels in the pyramid where the filter extents at radially outer rings get successively larger. In some examples filters at sampling points on different rings can have the same extent. In some examples filters at sampling points on a radially outer ring can have a smaller extent than filters at sampling points on a radially inner ring.

For a circular sampling pattern, examples of which are illustrated in FIGS. 3 and 8C, the descriptor pyramid may be termed a 'descriptor cone' instead. The term 'descriptor pyramid' is used herein, but it will be appreciated that, at least conceptually, the descriptor pyramid may represent other shapes in three dimensions.

The descriptor pyramid can be conceptually placed within the image pyramid to indicate the region of the image pyramid corresponding to the footprint of the feature descriptor pattern, and the region from which the set of initial samples will be obtained. The descriptor pyramid can be considered to move around the image pyramid as the data in the image pyramid is sampled to obtain the set of initial samples. This is schematically illustrated by dotted and dashed lines representing different descriptor pyramids within the image pyramid (the use of dotted and dashed lines is to aid clarity in FIG. 8A). The descriptor pyramid will appear larger at higher levels in the image pyramid, as shown. This is because of the relative change in length scale (corresponding to filter sizes) between the top and bottom of the descriptor pyramid. The number of levels in the image pyramid covered by the descriptor pyramid may be the same irrespective of its location within the image pyramid.

Sampling from the pyramid at the finest level of detail involves effectively placing the descriptor pyramid such that the highest levels of each align, as indicated at 804 in FIG. 8A. Moving the descriptor pyramid horizontally (or, strictly speaking, moving a 3D representation of the descriptor pyramid in the horizontal plane of a 3D representation of the image pyramid) will change the location in the image at which the descriptor pattern is applied, i.e. the location at which the descriptor pattern is centred. The descriptor pyramid need not be placed so as to align the highest level (or indeed any level) of the descriptor pyramid with the highest level (or any other level) of the image pyramid. This is illustrated at 806 showing the descriptor pyramid placed to as to sample at greater length scales from the scale-space data (the descriptor pyramid is shown in dashed lines rather than dotted lines here for clarity). A further example position of the descriptor pyramid is illustrated at 808, representing sampling at even greater length scales. In some examples, to zoom in by a factor of 2 (i.e. to analyse the scale-space data at half the resolution), the descriptor pyramid can be moved down the image pyramid by one level (where each pixel at one level of the pyramid is obtained from a 2×2 block of pixels at the next highest level).

The horizontal extent of the image pyramid represents the size of the image. The horizontal extent of the descriptor pyramid represents, at the widest part, the size (e.g. area or extent) of the descriptor pattern (i.e. the outer ring of sampling points in the descriptor pattern, but not the full extent of the Gaussian filtering rings corresponding to the sampling points in that outer ring) in the image. At the narrowest part, i.e. at the bottom point as illustrated, the horizontal extent of the descriptor pyramid represents the level of filtering where one sample represents the whole region.

Hence moving the descriptor pyramid across the image pyramid (corresponding to sampling from locations across the image) can be used to search for image feature matches at a given length scale. This can be useful where, for example, an object moves past a camera. Moving the descriptor pyramid down the image pyramid (corresponding to sampling at greater length scales) can be used to search for image feature matches, for example at a given location in an image, at greater length scales. This can be useful where, for example, an object moves directly away from the camera. Typically, a combination of horizontal and vertical movement of the descriptor pyramid relative to the image pyramid will be performed. This combination of horizontal and vertical movement permits both changes in location and changes in length scale to be considered in performing feature matching. The feature matching process can start at the highest-level resolution of the scale-space data (i.e. by placing the descriptor pyramid so as to align its highest level with level 0 of the image pyramid), but this need not be the case.

This approach enables the use of the same descriptor pattern and size when sampling the data, irrespective of the length scale at which the data is sampled. This permits a consistent sampling to be performed. A greater consistency of sampling can permit a more accurate comparison of the resulting feature descriptors.

The position of the descriptor pyramid within the image pyramid when searching for an object in an image can be selected based on motion estimation, for example by estimating the likely motion of the object from a known location in a different image. For example, the position of the descriptor pyramid can correspond to the last known location of the object, such as in a previous image. The position of the descriptor pyramid can correspond to a movement from this last known location. For example, if the object is known or thought to be moving at a speed in the positive x-direction of 10 pixels per frame, then where the object is known to be at position (x, y) in the previous image, the descriptor pyramid can be positioned so as to apply the feature descriptor pattern about a location (x+10, y) in the current image. A search area may be defined in which to apply the descriptor pattern. To give some examples, the search area may be centred on the last known position of an object, an estimated position of the object, and so on. The search area may be offset from the last known position of an object, the offset being determined in dependence on, for example, an estimated movement of the object.

As described, it is possible to generate feature descriptors at different length scales in the scale-space data. Each feature descriptor, i.e. in respect of the different length scales, can be compared. The results of the comparison may comprise a measure of the likelihood of a feature being at the respective length scale. The results of the comparisons may indicate that there is a matching feature at the respective location and length scale.

Where the measure of the likelihood, is greater (or lower) for a greater likelihood, a maximum (or minimum) in the set of results can be used to identify the most likely length scale at which that feature is located, or the portion of the scale-space data at which that length scale is represented; in general, a turning point in the measure of likelihood can be used. The identified length scale may be a length scale in the set of discrete length scales comprising the scale-space data. The identified length scale may be between length scales in the set of discrete length scales comprising the scale-space data. Applying a feature detector at different length scales can usefully identify the most likely length scale at which a feature is located or represented. When generating a feature descriptor for that feature, sampling the scale-space data may comprise sampling the scale-space data at the identified length scale, or interpolating between length scales to either side of the identified length scale.

A process may comprise sampling from the scale-space representation of the image to generate a measure of rotation, and sampling one or more further times from the scale-space representation of the image to generate a feature descriptor. A process may comprise sampling from the scale-space representation to generate an array, generating a measure of rotation in dependence on the array and generating a feature descriptor in dependence on the array and generated measure of rotation. A process may comprise sampling from the scale-space representation to generate a first feature descriptor in respect of a first location in the image, and sampling from the scale-space representation to generate a second feature descriptor in respect of a second location in the image. In practice, it is likely that many features in an image will be detected for matching with features in other images.

Hence there is likely to be significant re-use of the scale-space representation of a particular image. This justifies the additional processing cost of generating the scale-space representation up-front, and is likely to result in overall processing and memory bandwidth savings in light of the many features to be considered.

A second image may be represented by a second set of scale-space data. A process may comprise sampling from the second set of scale-space data to generate a feature descriptor in respect of the second image. A process may comprise sampling from the second set of scale-space data to generate a third feature descriptor in respect of a third location, the third location being in the second image, and sampling from the second set of scale-space data to generate a fourth feature descriptor in respect of a fourth location, the fourth location being in the second image.

At least one of the feature descriptors in respect of the original image, for example the first and/or second descriptor, may be compared to at least one of the feature descriptors in respect of the second image, for example the third and/or fourth descriptor, to identify a match, or a most likely match, between the feature descriptors. This can permit a match to be identified between a location in the original image and a location in the second image.

Figure 9:
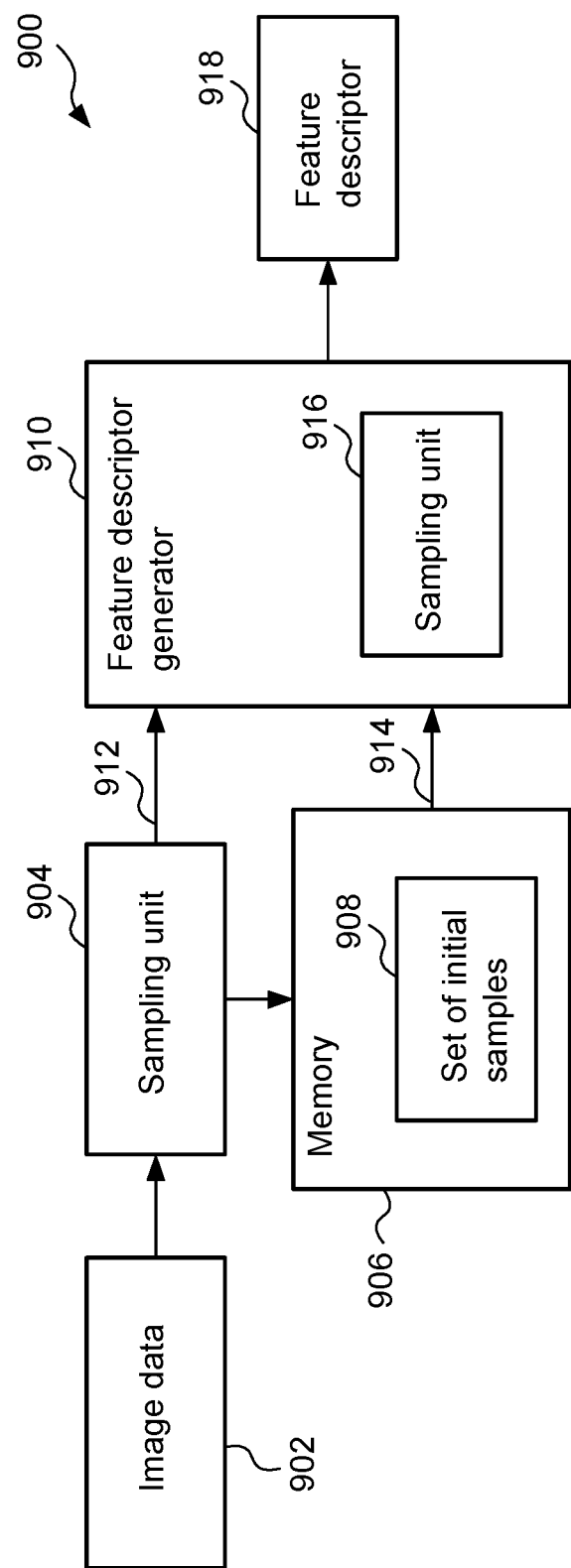
FIG. 9 schematically shows an example of a descriptor generation apparatus.
Figure 10:
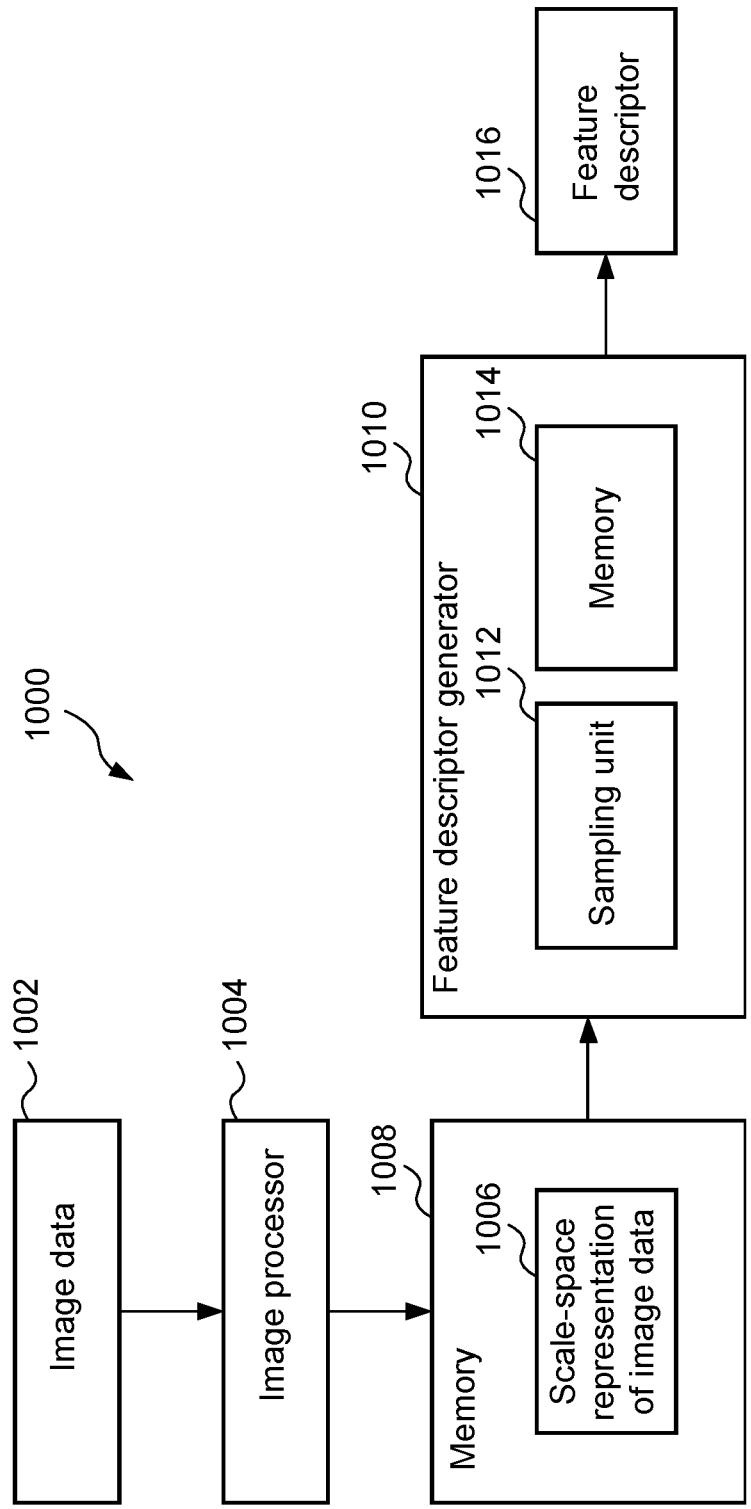
FIG. 10 schematically shows another example of a descriptor generation apparatus.

Reference is now made to FIGS. 9 and 10, which show, in schematic form, apparatus for implementing the systems and processes described above, which may generally be called descriptor generation systems, or descriptor generators. Referring initially to FIG. 9, an apparatus, or descriptor generation system, is shown at 900. Image data is provided at 902. This can be in the form of an input for receiving image data, a memory for storing image data, or the like. A sampling unit 904 samples the image data 902. The sampling unit is configured to extract sample values from the image data. The extracted sample values are stored in a memory 906. The extracted sample values can be stored in the form of a set of initial samples 908, for example as an array. A feature descriptor generator 910 is provided for generating feature descriptors. The feature descriptor generator can receive the extracted samples directly from the sampling unit 904, as indicated at 912, or it can receive the samples from the memory 906, as indicated at 914. The feature descriptor generator 910 generates a feature descriptor 918 based on the set of initial samples. The feature descriptor generator may be configured to determine a measure of rotation in respect of the sampled area of the image in dependence on the set of initial samples. The measure of rotation can, in some examples, be determined elsewhere, such as at the sampling unit 904. The feature descriptor generator generates a rotation-invariant feature descriptor based on the set of initial samples and the determined measure of rotation.

The feature descriptor generator comprises a sampling unit 916. The sampling unit 916 is configured to sample from the set of initial samples 908 stored in the memory 906. The sampling unit 916 is configured to at least one of shift elements of the set of initial samples and interpolate between elements of the set of initial samples to form a modified array. The feature descriptor generator is configured to output the feature descriptor 918.

Referring now to FIG. 10, an apparatus, or descriptor generation system, is shown at 1000. Image data is provided at 1002. This can be in the form of an input for receiving image data, a memory for storing image data, or the like. An image processor is provided at 1004. The image processor is configured to generate scale-space data representative of the image data 1002 at a plurality of length scales. The scale-space data 1006 is stored in a memory 1008.

A feature descriptor generator 1010 is provided for generating feature descriptors. The feature descriptor generator comprises a sampling unit 1012. The sampling unit 1012 is configured to sample the scale-space data 1006. The sampling unit 1012 can sample the scale-space data 1006 to obtain a set of initial samples. The set of initial samples may be stored in a memory 1014. The sampling unit may be configured to subsequently sample from at least one of the scale-space data 1006 and the set of initial samples stored in the memory 1014.

The feature descriptor generator 1010 is configured to generate a feature descriptor 1016 based on the sampled scale-space data and/or the sampled set of initial samples, as described above. The feature descriptor generator may be configured to determine a measure of rotation in respect of the sampled area of the image in dependence on the set of initial samples, such as at the sampling unit 1012. In an implementation, the sampling unit 1012 of the feature descriptor generator 1010 is configured to at least one of shift elements of the set of initial samples and interpolate between elements of the set of initial samples to form a modified array, in dependence on the measure of rotation. The modified array may be stored, at least temporarily, at the memory 1014. The feature descriptor generator generates a rotation-invariant feature descriptor based on the modified array. The feature descriptor generator 1010 is configured to output the feature descriptor 1016. Once the feature descriptor has been generated, the modified array may be discarded.

The descriptor generation systems of FIGS. 9 and 10 are shown as comprising a number of functional blocks. This is schematic only and is not intended to define a strict division between different logic elements of such entities. Each functional block may be provided in any suitable manner. It is to be understood that intermediate values described herein as being formed by a descriptor generation system need not be physically generated by the descriptor generation system at any point and may merely represent logical values which conveniently describe the processing performed by the descriptor generation system between its input and output.

The descriptor generation systems described herein may be embodied in hardware on an integrated circuit. The descriptor generation systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a descriptor generation system configured to perform any of the methods described herein, or to manufacture a descriptor generation system comprising any apparatus described herein. An integrated circuit definition dataset may be, for example, an integrated circuit description.

There may be provided a method of manufacturing, at an integrated circuit manufacturing system, a descriptor generation system as described herein. There may be provided an integrated circuit definition dataset that, when processed in an integrated circuit manufacturing system, causes the method of manufacturing a descriptor generation system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a descriptor generation system will now be described with respect to FIG. 11.

Figure 11:
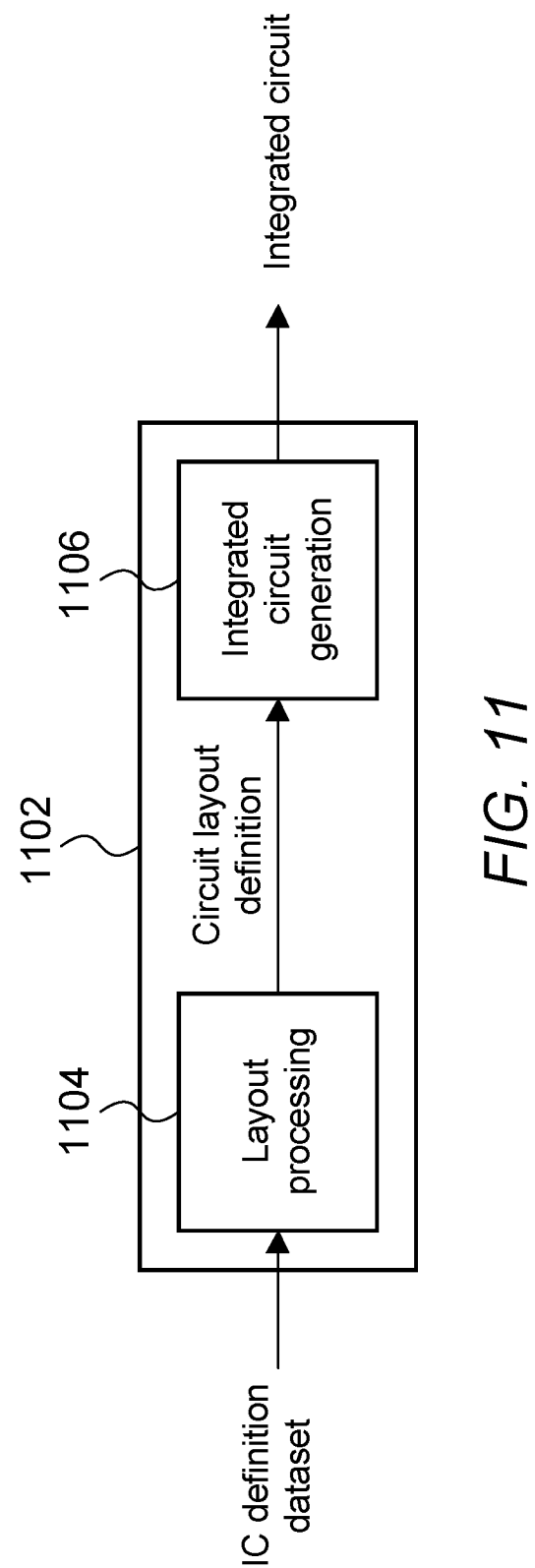
FIG. 11 is a schematic diagram of an integrated circuit manufacturing system.

FIG. 11 shows an example of an integrated circuit (IC) manufacturing system 1102 which is configured to manufacture a descriptor generation system as described in any of the examples herein. In particular, the IC manufacturing system 1102 comprises a layout processing system 1104 and an integrated circuit generation system 1106. The IC manufacturing system 1102 is configured to receive an IC definition dataset (e.g. defining a descriptor generation system as described in any of the examples herein), process the IC definition dataset, and generate an IC according to the IC definition dataset (e.g. which embodies a descriptor generation system as described in any of the examples herein). The processing of the IC definition dataset configures the IC manufacturing system 1102 to manufacture an integrated circuit embodying a descriptor generation system as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a descriptor generation system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The processing systems described herein may be embodied in hardware on an integrated circuit. The processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A descriptor generation system for generating a feature descriptor for a location in an image for use in performing descriptor matching in analysing the image, the descriptor generation system being configured to:
  obtain scale-space data representative of the image, said scale-space data comprising a pre-filtered representation of the image at a plurality of length scales;
  the descriptor generation system having a feature descriptor generator configured to:
    determine a set of samples characterising a location in an image by sampling, using a sampling unit, the scale-space data representative of the image in accordance with a descriptor pattern of the feature descriptor, wherein the descriptor pattern is used to determine length scales at which the samples are to be sampled from the pre-filtered representation of the image; and generate the feature descriptor in dependence on the determined set of samples;

wherein the descriptor generation system is configured to place a relatively smaller scale-space representation within a relatively larger scale-space representation in dependence on an identified length scale, and the relatively smaller scale-space representation comprises a descriptor pyramid and the relatively larger scale-space representation comprises an image pyramid.

2. A descriptor generation system according to claim 1, in which the feature descriptor generator is further configured such that if a determined length scale does not match one of the length scales of the pre-filtered representation of the image then said sampling the scale-space data comprises interpolating between data at levels in the scale-space data associated with length scales above and below the determined length scale.

3. A descriptor generation system according to claim 1, in which the pre-filtered representation of the image has been filtered using one or more of a low-pass filter, a Gaussian filter and a box filter.

4. A descriptor generation system according to claim 1, in which the location in the image is one or more of:
a point in the image;
a pixel location in the image; and
a keypoint in the image.

5. A descriptor generation system according to claim 1, in which the feature descriptor generator is configured to sample the scale-space data by:
analysing portions of the scale-space data representing the location at different length scales to determine a measure of likelihood for each analysed portion, the measure of likelihood representing the likelihood of a feature being at the respective length scale;
determining the portion of the scale-space data resulting in a turning point in the measure of likelihood; and
determining a length scale at which to sample the scale-space data to determine the set of samples in dependence on the determined portion.

6. A descriptor generation system according to claim 1, in which the descriptor generation system is configured to identify the location in the image in accordance with one or more location identification or detection algorithms, and in which the descriptor generation system is configured to identify at least one of a location and a length scale in the scale-space data associated with the identified location in the image.

7. A descriptor generation system according to claim 6, in which the feature descriptor generator is configured to sample the scale-space data, wherein the sampling is performed by one or more of:
in dependence on the identified length scale;
at a level in the scale-space data associated with the identified length scale; and
by interpolating between data at levels in the scale-space data associated with length scales above and below the identified length scale.

8. A descriptor generation system according to claim 1, in which the data in the scale-space data having been filtered at different length scales corresponds to filtered samples to be extracted in respect of different radial distances in the descriptor pattern from the centre of the descriptor pattern.

9. A descriptor generation system according to claim 1, in which the descriptor pattern comprises at least one ring surrounding the location in the image, in which the at least one ring is one of a circle, a wavy circle and a polygon.

10. A descriptor generation system according to claim 1, in which the descriptor generation system is configured to:
store the determined set of samples in an array, and the feature descriptor generator is configured to generate the feature descriptor in dependence on the determined set of samples by forming a modified array; and/or
determine a measure of rotation for the location in the image, the measure of rotation describing an angle between an orientation of the image and a characteristic direction of the image at the location, and generate the feature descriptor in dependence on the determined measure of rotation.

11. A descriptor generation system according to claim 10, in which the descriptor generation system is configured to discard the modified array once the feature descriptor has been generated.

12. A descriptor generation system according to claim 10, in which the descriptor generation system is configured to form the modified array by one or more of:
shifting elements of at least one portion of the array along a number of positions in the respective portion of the array, the number of positions being determined in dependence on the determined measure of rotation; and
interpolating between two or more samples of the determined set of samples.

13. A descriptor generation system according to claim 12, in which the two or more samples of the determined set of samples have been obtained from one or more ring of the descriptor pattern.

14. A descriptor generation system according to claim 12, in which the two or more samples of the determined set of samples between which interpolation is performed have been obtained from adjacent rings in the descriptor pattern.

15. A descriptor generation system according to claim 12, in which the two or more samples of the determined set of samples comprise $N_1$ samples from a first ring and $N_2$ samples from a second ring, where $N_1 \leq N_2$, in which the first ring is radially inside the second ring.

16. A descriptor generation system according to claim 13, in which the descriptor generation system is configured to form the modified array by interpolating between the two or more samples of the determined set of samples along a portion of the shape of the ring to which the two or more samples correspond.

17. A computer-implemented method for generating a feature descriptor for a location in an image for use in performing descriptor matching in analysing the image, the method comprising:
obtaining scale-space data representative of the image, said scale-space data comprising a pre-filtered representation of the image at a plurality of length scales;
determining a set of samples characterising a location in an image by sampling the scale-space data representative of the image in accordance with a descriptor pattern of the feature descriptor, wherein the descriptor pattern is used to determine length scales at which the samples are to be sampled from the pre-filtered representation of the image;
generating the feature descriptor in dependence on the determined set of samples; and
placing a relatively smaller scale-space representation within a relatively larger scale-space representation in dependence on an identified length scale, and the relatively smaller scale-space representation comprises a descriptor pyramid and the relatively larger scale-space representation comprises an image pyramid.

18. A non-transitory computer readable storage medium having stored thereon computer readable instructions that, when executed at a computer system, cause the computer system to:
- obtain scale-space data representative of an image, said scale-space data comprising a pre-filtered representation of the image at a plurality of length scales;
- determine a set of samples characterising a location in an image by sampling the scale-space data representative of the image in accordance with a descriptor pattern of a feature descriptor, wherein the descriptor pattern is used to determine length scales at which the samples are to be sampled from the pre-filtered representation of the image;
- generate the feature descriptor in dependence on the determined set of samples; and
- place a relatively smaller scale-space representation within a relatively larger scale-space representation in dependence on an identified length scale, and the relatively smaller scale-space representation comprises a descriptor pyramid and the relatively larger scale-space representation comprises an image pyramid.

* * * * *